(12) United States Patent
Cowburn et al.

(10) Patent No.: US 8,892,556 B2
(45) Date of Patent: Nov. 18, 2014

(54) OPTIMISATION

(75) Inventors: Russell Paul Cowburn, London (GB); James David Ralph Buchanan, London (GB)

(73) Assignee: Ingenia Holdings Limited, Road Town (VG)

(*) Notice: Subject to any disclaimer, the term of this patent is extended or adjusted under 35 U.S.C. 154(b) by 381 days.

(21) Appl. No.: 13/505,424

(22) PCT Filed: Nov. 4, 2010

(86) PCT No.: PCT/GB2010/051844
§ 371 (c)(1),
(2), (4) Date: Jun. 13, 2012

(87) PCT Pub. No.: WO2011/058343
PCT Pub. Date: May 19, 2011

(65) Prior Publication Data
US 2012/0246159 A1 Sep. 27, 2012

Related U.S. Application Data

(60) Provisional application No. 61/259,946, filed on Nov. 10, 2009.

(30) Foreign Application Priority Data

Nov. 10, 2009 (GB) .................................. 0919664.3

(51) Int. Cl.
*G06F 17/30* (2006.01)
*G06K 9/00* (2006.01)
*G06K 9/62* (2006.01)
*G07D 7/20* (2006.01)

(52) U.S. Cl.
CPC .......... *G07D 7/2075* (2013.01); *G06K 9/00543* (2013.01); *G06K 9/00577* (2013.01); *G06K 9/6217* (2013.01); *G06K 9/0053* (2013.01)
USPC .......................................................... 707/736

(58) Field of Classification Search
CPC ................................................ G06F 17/30286
USPC .................... 707/736; 382/100, 181; 713/176
See application file for complete search history.

(56) References Cited

U.S. PATENT DOCUMENTS 3,781,109 A 12/1973 Mayer, Jr. et al.
(Continued)

FOREIGN PATENT DOCUMENTS

CA 2292594 12/1998
(Continued)

OTHER PUBLICATIONS

International Search Report and Written Opinion for PCT/GB2010/051844 mailed Feb. 17, 2011, 10 pages.
(Continued)

*Primary Examiner* — Cheryl Lewis
(74) *Attorney, Agent, or Firm* — McDonnell Boehnen Hulbert & Berghoff LLP

(57) ABSTRACT

There is described a method for implementing a system for authentication of an article based upon a signature generated from a set comprising groups of data points collected when a plurality of regions of an intrinsic surface structure of an article are sequentially subjected to coherent light and the light scattered by the intrinsic surface structure is collected. For a given system implementation, the method comprises: determining a set of parameters which influence the performance of the system; determining a definition of system performance which can be affected by the set of parameters; producing an initial population of parameter value sets, each parameter set including a value for each parameter to be used in achieving a desired system performance; determining for each parameter value set a fitness value in terms of the system performance definition; identifying mating pairs of the population in accordance with the determined fitnesses; producing a new population by crossing the mating pairs; repeating the determining of a fitness value for each parameter value set, identifying of mating pairs and producing a new population until an end criterion is satisfied; and configuring the system in accordance with a selected one of the parameter sets from the final population. Thereby, a flexible and appropriate approach to system implementation can be followed which provides high efficiency in terms of the human time input and which provides high quality reliable setup parameter values to enable a reliable and efficient system implementation to result.

18 Claims, 22 Drawing Sheets

(56) References Cited

U.S. PATENT DOCUMENTS

| | | |
|---|---|---|
| 3,877,019 A | 4/1975 | Auerbach et al. |
| 4,179,212 A | 12/1979 | Lahr |
| 4,218,674 A | 8/1980 | Brosow et al. |
| 4,423,415 A | 12/1983 | Goldman |
| 4,525,748 A | 6/1985 | Carbone |
| 4,537,504 A | 8/1985 | Baltes et al. |
| 4,544,266 A | 10/1985 | Antes |
| 4,568,936 A | 2/1986 | Goldman |
| 4,582,986 A | 4/1986 | Stockburger et al. |
| 4,599,509 A | 7/1986 | Silverman et al. |
| 4,738,901 A | 4/1988 | Finkel et al. |
| 4,748,316 A | 5/1988 | Dickson |
| 4,754,487 A | 6/1988 | Newmuis |
| 4,785,290 A | 11/1988 | Goldman et al. |
| 4,791,669 A | 12/1988 | Kage |
| 4,797,921 A | 1/1989 | Shiraishi |
| 4,817,176 A | 3/1989 | Marshall et al. |
| 4,820,912 A | 4/1989 | Samyn |
| 4,882,764 A | 11/1989 | Reynolds et al. |
| 4,920,385 A | 4/1990 | Clarke et al. |
| 4,929,821 A | 5/1990 | Kocznar et al. |
| 5,003,596 A | 3/1991 | Wood |
| 5,054,066 A | 10/1991 | Riek et al. |
| 5,058,164 A | 10/1991 | Elmer et al. |
| 5,059,776 A | 10/1991 | Antes |
| 5,060,065 A | 10/1991 | Wasserman |
| 5,081,675 A | 1/1992 | Kittirutsunetorn |
| 5,103,479 A | 4/1992 | Takaragi et al. |
| 5,120,126 A | 6/1992 | Wertz et al. |
| 5,133,601 A | 7/1992 | Cohen et al. |
| 5,142,578 A | 8/1992 | Matyas et al. |
| 5,194,918 A | 3/1993 | Kino et al. |
| 5,243,405 A | 9/1993 | Tichenor et al. |
| 5,258,605 A | 11/1993 | Metlitsky et al. |
| 5,295,196 A | 3/1994 | Raterman et al. |
| 5,306,899 A | 4/1994 | Marom et al. |
| 5,307,423 A | 4/1994 | Gupta et al. |
| 5,325,167 A | 6/1994 | Melen |
| 5,384,717 A | 1/1995 | Ebenstein |
| 5,451,759 A | 9/1995 | Hoshino et al. |
| 5,453,840 A | 9/1995 | Parker et al. |
| 5,475,694 A | 12/1995 | Ivanov et al. |
| 5,485,312 A | 1/1996 | Horner et al. |
| 5,488,661 A | 1/1996 | Matsui |
| 5,510,199 A | 4/1996 | Martin |
| 5,521,984 A | 5/1996 | Denenberg et al. |
| 5,539,840 A | 7/1996 | Krtolica et al. |
| 5,546,462 A | 8/1996 | Indeck et al. |
| 5,637,854 A | 6/1997 | Thomas |
| 5,647,010 A | 7/1997 | Okubo et al. |
| 5,673,338 A | 9/1997 | Denenberg et al. |
| 5,687,002 A | 11/1997 | Itoh |
| 5,760,386 A | 6/1998 | Ward |
| 5,767,988 A | 6/1998 | Dobbs et al. |
| 5,781,708 A | 7/1998 | Austin et al. |
| 5,784,463 A | 7/1998 | Chen et al. |
| 5,790,025 A | 8/1998 | Amer et al. |
| 5,886,798 A | 3/1999 | Staub et al. |
| 5,903,340 A | 5/1999 | Lawandy et al. |
| 5,903,721 A | 5/1999 | Sixtus |
| 5,912,974 A | 6/1999 | Holloway et al. |
| 5,974,150 A | 10/1999 | Kaish et al. |
| 6,029,150 A | 2/2000 | Kravitz |
| 6,141,119 A | 10/2000 | Tseng et al. |
| 6,182,892 B1 | 2/2001 | Angelo et al. |
| 6,193,156 B1 | 2/2001 | Han et al. |
| 6,223,166 B1 | 4/2001 | Kay |
| 6,246,061 B1 | 6/2001 | Ramsey et al. |
| 6,265,907 B1 | 7/2001 | Sukegawa |
| 6,280,797 B1 | 8/2001 | Kuczynski et al. |
| 6,328,209 B1 | 12/2001 | O'Boyle |
| 6,332,663 B1 | 12/2001 | Puzio |
| 6,360,001 B1 | 3/2002 | Berger et al. |
| 6,373,573 B1 | 4/2002 | Jung et al. |
| 6,388,744 B1 | 5/2002 | Kubota et al. |
| 6,389,151 B1 | 5/2002 | Carr et al. |
| 6,390,368 B1 | 5/2002 | Edwards |
| 6,466,329 B1 | 10/2002 | Mukai |
| 6,473,165 B1 | 10/2002 | Coombs et al. |
| 6,529,269 B1 | 3/2003 | Sugata |
| 6,560,355 B2 | 5/2003 | Graves et al. |
| 6,563,129 B1 | 5/2003 | Knobel |
| 6,584,214 B1 | 6/2003 | Pappu et al. |
| 6,603,874 B1 | 8/2003 | Stern et al. |
| 6,605,819 B2 | 8/2003 | Ross |
| 6,621,916 B1 | 9/2003 | Smith et al. |
| 6,760,472 B1 | 7/2004 | Takeda et al. |
| 6,779,720 B2 | 8/2004 | Lewis |
| 6,798,900 B1 | 9/2004 | Sugata |
| 6,850,147 B2 | 2/2005 | Prokoski et al. |
| 6,885,977 B2 | 4/2005 | Gavra et al. |
| 6,902,111 B2 | 6/2005 | Han et al. |
| 6,928,552 B1 | 8/2005 | Mischenko et al. |
| 6,955,141 B2 | 10/2005 | Santanam et al. |
| 6,961,449 B2 | 11/2005 | Mil'shtein et al. |
| 6,975,404 B2 | 12/2005 | Schwarz |
| 7,002,675 B2 | 2/2006 | MacGibbon et al. |
| 7,082,216 B2 | 7/2006 | Jones et al. |
| 7,089,420 B1 | 8/2006 | Durst et al. |
| 7,104,449 B2 | 9/2006 | Han et al. |
| 7,110,573 B2 | 9/2006 | Monk et al. |
| 7,111,321 B1 | 9/2006 | Watts, Jr. et al. |
| 7,119,662 B1 | 10/2006 | Horigucchi et al. |
| 7,143,949 B1 | 12/2006 | Hannigan |
| 7,152,047 B1 | 12/2006 | Nagel |
| 7,162,035 B1 | 1/2007 | Durst et al. |
| 7,170,391 B2 | 1/2007 | Lane et al. |
| 7,221,445 B2 | 5/2007 | Earthman et al. |
| 7,268,923 B2 | 9/2007 | Schroath et al. |
| 7,277,183 B2 | 10/2007 | Deck |
| 7,318,048 B1 | 1/2008 | King |
| 7,333,629 B2 | 2/2008 | Patton et al. |
| 7,336,842 B2 | 2/2008 | Kondo |
| 7,346,184 B1 | 3/2008 | Carr et al. |
| 7,353,994 B2 | 4/2008 | Farrall et al. |
| 7,389,420 B2 | 6/2008 | Tian |
| 7,391,889 B2 | 6/2008 | Kim et al. |
| 7,394,573 B1 | 7/2008 | Goldberg et al. |
| 7,497,379 B2 | 3/2009 | Chen et al. |
| 7,567,349 B2 | 7/2009 | Tearney et al. |
| 7,577,844 B2 | 8/2009 | Kirovski |
| 7,599,927 B2 | 10/2009 | Lebrat |
| 7,599,963 B2 | 10/2009 | Fernandez |
| 7,647,279 B2 | 1/2010 | Bourrieres et al. |
| 7,716,297 B1 | 5/2010 | Wittel et al. |
| 7,731,435 B2 | 6/2010 | Piersol et al. |
| 7,755,768 B2 * | 7/2010 | Mansfield ............ 356/497 |
| 7,773,749 B1 | 8/2010 | Durst et al. |
| 7,809,156 B2 | 10/2010 | Piersol et al. |
| 7,853,792 B2 | 12/2010 | Cowburn |
| 7,920,714 B2 | 4/2011 | O'Neil |
| 7,949,148 B2 | 5/2011 | Rhoads et al. |
| 8,009,800 B2 | 8/2011 | Doyle et al. |
| 8,077,905 B2 | 12/2011 | Rhoads et al. |
| 8,078,875 B2 | 12/2011 | Cowburn et al. |
| 8,171,567 B1 | 5/2012 | Fraser et al. |
| 8,224,018 B2 | 7/2012 | Rhoads et al. |
| 8,270,603 B1 | 9/2012 | Durst et al. |
| 2001/0021926 A1 | 9/2001 | Schneck et al. |
| 2002/0041787 A1 | 4/2002 | Thomas |
| 2002/0061120 A1 | 5/2002 | Carr et al. |
| 2002/0091555 A1 | 7/2002 | Leppink |
| 2002/0105654 A1 | 8/2002 | Goltsos et al. |
| 2002/0111837 A1 | 8/2002 | Aupperle |
| 2002/0116329 A1 | 8/2002 | Serbetcioglu et al. |
| 2002/0120592 A1 | 8/2002 | Juels et al. |
| 2002/0190953 A1 | 12/2002 | Gordon et al. |
| 2003/0002067 A1 | 1/2003 | Miyano |
| 2003/0012374 A1 | 1/2003 | Wu et al. |
| 2003/0018587 A1 | 1/2003 | Althoff et al. |
| 2003/0028494 A1 | 2/2003 | King et al. |
| 2003/0035539 A1 | 2/2003 | Thaxton |
| 2003/0093690 A1 | 5/2003 | Kemper |
| 2003/0105950 A1 | 6/2003 | Hirano et al. |

(56) References Cited

U.S. PATENT DOCUMENTS

| | | |
|---|---|---|
| 2003/0118191 A1 | 6/2003 | Wang et al. |
| 2003/0156294 A1 | 8/2003 | D'Agraives et al. |
| 2003/0156303 A1 | 8/2003 | Schnee et al. |
| 2003/0178487 A1 | 9/2003 | Rogers |
| 2003/0219145 A1 | 11/2003 | Smith |
| 2003/0231806 A1 | 12/2003 | Troyanker |
| 2004/0016810 A1 | 1/2004 | Hori et al. |
| 2004/0031849 A1 | 2/2004 | Hori et al. |
| 2004/0052377 A1 | 3/2004 | Mattox et al. |
| 2004/0059952 A1 | 3/2004 | Newport et al. |
| 2004/0101158 A1 | 5/2004 | Butler et al. |
| 2004/0125488 A1 | 7/2004 | Zhu et al. |
| 2004/0155913 A1 | 8/2004 | Kosugi et al. |
| 2004/0156529 A1 | 8/2004 | Davis et al. |
| 2004/0190085 A1 | 9/2004 | Silverbrook et al. |
| 2004/0199765 A1 | 10/2004 | Kohane et al. |
| 2004/0212826 A1 | 10/2004 | Kashiwaki |
| 2005/0006472 A1 | 1/2005 | Verschuur et al. |
| 2005/0038756 A1 | 2/2005 | Nagel |
| 2005/0044385 A1 | 2/2005 | Holdsworth |
| 2005/0060171 A1 | 3/2005 | Molnar |
| 2005/0060555 A1 | 3/2005 | Raghunath et al. |
| 2005/0077488 A1 | 4/2005 | Nekrasov et al. |
| 2005/0101841 A9 | 5/2005 | Kaylor et al. |
| 2005/0108057 A1 | 5/2005 | Cohen et al. |
| 2005/0110978 A1 | 5/2005 | Potyrailo et al. |
| 2005/0122209 A1 | 6/2005 | Black |
| 2005/0135260 A1 | 6/2005 | Todd |
| 2005/0178841 A1 | 8/2005 | Jones et al. |
| 2005/0180599 A1 | 8/2005 | Davis et al. |
| 2005/0199723 A1 | 9/2005 | Lubow |
| 2005/0217969 A1 | 10/2005 | Coombs et al. |
| 2006/0022059 A1 | 2/2006 | Juds |
| 2006/0102830 A1 | 5/2006 | Brill et al. |
| 2006/0104103 A1 | 5/2006 | Colineau et al. |
| 2006/0163504 A1 | 7/2006 | Fujimoto et al. |
| 2006/0166381 A1 | 7/2006 | Lange |
| 2006/0256959 A1 | 11/2006 | Hymes |
| 2006/0294583 A1 | 12/2006 | Cowburn et al. |
| 2007/0025619 A1 | 2/2007 | Cowburn et al. |
| 2007/0028107 A1 | 2/2007 | Cowburn et al. |
| 2007/0028108 A1 | 2/2007 | Cowburn et al. |
| 2007/0036470 A1 | 2/2007 | Piersol et al. |
| 2007/0053005 A1 | 3/2007 | Cowburn |
| 2007/0058037 A1 | 3/2007 | Bergeron et al. |
| 2007/0113076 A1 | 5/2007 | Cowburn et al. |
| 2007/0115497 A1 | 5/2007 | Cowburn |
| 2007/0136612 A1 | 6/2007 | Asano et al. |
| 2007/0153078 A1 | 7/2007 | Cowburn |
| 2007/0153269 A1 | 7/2007 | Wang et al. |
| 2007/0162961 A1 | 7/2007 | Tarrance et al. |
| 2007/0164729 A1 | 7/2007 | Cowburn et al. |
| 2007/0165208 A1 | 7/2007 | Cowburn et al. |
| 2007/0188793 A1 | 8/2007 | Wakai |
| 2007/0192850 A1 | 8/2007 | Cowburn |
| 2007/0199047 A1 | 8/2007 | Gibart et al. |
| 2007/0253001 A1 | 11/2007 | Watanabe et al. |
| 2007/0271456 A1 | 11/2007 | Ward et al. |
| 2008/0002243 A1 | 1/2008 | Cowburn |
| 2008/0016358 A1 | 1/2008 | Filreis et al. |
| 2008/0044096 A1 | 2/2008 | Cowburn et al. |
| 2008/0051033 A1 | 2/2008 | Hymes |
| 2008/0240816 A1 | 10/2008 | Piersol et al. |
| 2008/0260199 A1 | 10/2008 | Cowburn et al. |
| 2008/0294900 A1 | 11/2008 | Cowburn |
| 2009/0016535 A1 | 1/2009 | Cowburn |
| 2009/0083372 A1 | 3/2009 | Teppler |
| 2009/0254991 A1 | 10/2009 | Boulanger et al. |
| 2009/0283583 A1 | 11/2009 | Cowburn et al. |
| 2009/0290906 A1 | 11/2009 | Cowburn |
| 2009/0303000 A1 | 12/2009 | Cowburn et al. |
| 2009/0307112 A1 | 12/2009 | Cowburn et al. |
| 2010/0004875 A1 | 1/2010 | Urano et al. |
| 2010/0007930 A1 | 1/2010 | Cowburn et al. |
| 2010/0008590 A1 | 1/2010 | Cowburn |
| 2010/0141380 A1 | 6/2010 | Pishva |
| 2010/0158377 A1 | 6/2010 | Cowburn et al. |
| 2010/0161529 A1 | 6/2010 | Cowburn et al. |
| 2010/0277446 A1 | 11/2010 | van Veenendaal et al. |

FOREIGN PATENT DOCUMENTS

| | | |
|---|---|---|
| CN | 1588847 | 3/2005 |
| DE | 19632269 | 2/1997 |
| DE | 19612819 | 10/1997 |
| DE | 10155780 | 5/2003 |
| DE | 10234431 | 2/2004 |
| EP | 0 161 181 | 11/1985 |
| EP | 0278058 | 8/1988 |
| EP | 0334201 | 9/1989 |
| EP | 0 378 198 | 7/1990 |
| EP | 0472192 | 2/1992 |
| EP | 0480620 | 4/1992 |
| EP | 0570162 | 11/1993 |
| EP | 0691632 | 1/1996 |
| EP | 0234105 | 9/1997 |
| EP | 1087348 | 3/2001 |
| EP | 1202225 A2 | 5/2002 |
| EP | 1217589 | 6/2002 |
| EP | 1273461 | 1/2003 |
| EP | 1286315 | 2/2003 |
| EP | 1388797 | 2/2004 |
| EP | 1418542 | 5/2004 |
| EP | 1484719 | 12/2004 |
| EP | 1507227 | 2/2005 |
| EP | 1577812 | 9/2005 |
| EP | 1587030 | 10/2005 |
| EP | 1616711 | 12/2005 |
| EP | 1990779 | 11/2008 |
| FR | 2765014 | 12/1998 |
| GB | 1319928 | 3/1972 |
| GB | 1458726 | 12/1976 |
| GB | 2097979 | 11/1982 |
| GB | 2221870 | 2/1990 |
| GB | 2228821 | 9/1990 |
| GB | 2411954 | 9/1995 |
| GB | 2304077 | 3/1997 |
| GB | 2346110 | 1/2000 |
| GB | 2346111 | 1/2000 |
| GB | 2417074 | 2/2006 |
| GB | 2417592 | 3/2006 |
| GB | 2417707 | 3/2006 |
| GB | 2426100 | 11/2006 |
| GB | 2428846 | 2/2007 |
| GB | 2428948 | 2/2007 |
| GB | 2429092 | 2/2007 |
| GB | 2429095 | 2/2007 |
| GB | 2429096 | 2/2007 |
| GB | 2429097 | 2/2007 |
| GB | 2431759 | 5/2007 |
| GB | 2433632 | 6/2007 |
| GB | 2434642 | 8/2007 |
| GB | 2462059 | 1/2010 |
| JP | H02-10482 | 1/1990 |
| JP | 2183879 | 7/1990 |
| JP | H03192523 | 8/1991 |
| JP | 04265847 | 9/1992 |
| JP | H05504220 | 7/1993 |
| JP | H06-111008 | 4/1994 |
| JP | H06-301840 | 10/1994 |
| JP | 07210721 | 8/1995 |
| JP | H08-003548 | 1/1996 |
| JP | H08-180189 | 7/1996 |
| JP | 09218910 | 8/1997 |
| JP | H1021394 | 1/1998 |
| JP | H10-063914 | 3/1998 |
| JP | 63255793 | 10/1998 |
| JP | H11-224319 | 8/1999 |
| JP | 11339049 | 12/1999 |
| JP | 2000011230 | 1/2000 |
| JP | 2000149087 | 5/2000 |
| JP | 2000293105 | 10/2000 |
| JP | 2001521658 | 11/2001 |
| JP | 2002092682 | 3/2002 |

(56) References Cited

FOREIGN PATENT DOCUMENTS

| | | |
|---|---|---|
| JP | 2004102562 | 4/2002 |
| JP | 2003509745 | 3/2003 |
| JP | 2003141595 | 5/2003 |
| JP | 2003143388 | 5/2003 |
| JP | 2003150585 | 5/2003 |
| JP | 2003534536 | 11/2003 |
| JP | 2004077954 | 3/2004 |
| JP | 2004171109 | 6/2004 |
| JP | 2003228709 | 2/2005 |
| JP | 2005038389 | 2/2005 |
| JP | 2005217805 | 8/2005 |
| JP | 2005352854 | 12/2005 |
| JP | 2008523438 | 7/2008 |
| JP | 2008254443 | 10/2008 |
| JP | 2009175925 | 8/2009 |
| KR | 20050023050 | 3/2003 |
| NL | 8002604 | 12/1981 |
| NL | 9401796 C | 10/1994 |
| RU | 2043201 | 5/1993 |
| RU | 2065819 | 8/1996 |
| TW | 437229 | 5/2001 |
| TW | 570444 | 1/2004 |
| WO | 89/00742 | 1/1989 |
| WO | 91/11703 | 8/1991 |
| WO | 91/11778 | 8/1991 |
| WO | 91/19614 | 12/1991 |
| WO | 93/22745 | 11/1993 |
| WO | 95/24691 | 9/1995 |
| WO | 95/34018 | 12/1995 |
| WO | 96/36934 | 11/1996 |
| WO | 97/24699 | 7/1997 |
| WO | 99/13391 | 3/1999 |
| WO | 00/45344 | 8/2000 |
| WO | 00/46980 | 8/2000 |
| WO | 00/65541 | 11/2000 |
| WO | 01/18754 | 3/2001 |
| WO | 01/25024 | 4/2001 |
| WO | 01/43086 | 6/2001 |
| WO | 01/54077 A1 | 7/2001 |
| WO | 01/86574 | 11/2001 |
| WO | 01/86589 | 11/2001 |
| WO | 01/91007 | 11/2001 |
| WO | 02/50790 | 6/2002 |
| WO | 03/019463 | 3/2003 |
| WO | 03/087991 | 10/2003 |
| WO | 2004/025548 | 3/2004 |
| WO | 2004/025549 | 3/2004 |
| WO | 2004/057525 | 8/2004 |
| WO | 2004/070667 | 8/2004 |
| WO | 2004/097826 | 11/2004 |
| WO | 2004/109479 | 12/2004 |
| WO | 2005/004039 | 1/2005 |
| WO | 2005/004797 | 1/2005 |
| WO | 2005/027032 | 3/2005 |
| WO | 2005/029447 | 3/2005 |
| WO | 2005/048256 | 5/2005 |
| WO | 2005/078651 | 8/2005 |
| WO | 2005/080088 | 9/2005 |
| WO | 2005/086158 | 9/2005 |
| WO | 2005/088517 | 9/2005 |
| WO | 2005/088533 | 9/2005 |
| WO | 2005/122100 | 12/2005 |
| WO | 2006/016112 | 2/2006 |
| WO | 2006/016114 | 2/2006 |
| WO | 2006/021083 | 3/2006 |
| WO | 2006/132584 | 12/2006 |
| WO | 2007/012815 | 2/2007 |
| WO | 2007/012821 | 2/2007 |
| WO | 2007/028799 | 3/2007 |
| WO | 2007/071788 | 6/2007 |
| WO | 2007/072044 | 6/2007 |
| WO | 2007/080375 | 7/2007 |
| WO | 2007/111548 | 10/2007 |
| WO | 2007/144598 | 12/2007 |
| WO | 2009/141576 | 11/2009 |
| WO | 2010/004281 | 1/2010 |

OTHER PUBLICATIONS

Written Opinion of the International Search Authority for International Application PCT/BG2007/000015, mailed Jul. 16, 2008, 8 pages.
International Preliminary Report on Patentability, dated May 24, 2012, for PCT/GB2010/051844.
Anderson, Ross J., Security Engineering: A Guide to Building Dependable Distributed Systems, Chapter 12: Security Printing and Seals, pp. 251-253 John Wiley & Sons, Inc. (2001).
Anonymous, "Discs and Paper Get Biometric Identifiers," IEE Review, p. 23, (Dec. 2004).
Buchanan et al., "Fingerprinting' documents and packaging" Nature, vol. 436, p. 475 (Jul. 2005).
Chen et al., "Certifying Authenticity via Fiber-Infused Paper," ACM SIGecom Exchanges, vol. 5, No. 3, pp. 29-37 (Apr. 2005).
Cowburn, Russell, "Nanotechnology-Security and Brand Protection Applications 01," Smart Brand and Product Protection Conference 2005, Apr. 8, 2005 to Apr. 9, 2005, pp. 1-4, London, UK.
d'Agraives et al. "Surface Topography, A Remarkable Method for the Identification of Seals of Structures in General," Commission of the European Communities Joint Research Centre—Ispra Establishment I-21020 Ispra (Va), Italy, pp. 403-409 (1981).
Derrode S et al., "Robust and Efficient Fourier-Mellin Transform Approximations for Gray-Level Image Reconstruction and Complete Invariant Description," Computer Vision and Image Understanding, Academic Press, San Diego, CA, 83(1):57-78 (Jul. 2001).
El-Khamy S. E. et al., "The FBG stream cipher," Proceedings of the 24th Radio National Science Conference {NRSC 2007) IEEE Cairo, Egypt, pp. 1-8 (Mar. 2007).
International Search Report for Application No. PCT/GB2008/002020 mailed Jun. 10, 2005, 3 pages.
International Search Report for Great Britain Patent Application No. GB0711461.4 dated Sep. 21, 2007, 1 page.
Haist et al., "Optical detection of random features for high security applications," Optics Communications, 147:173-179 (1998).
Hao F. et al., "Combining crypto with biometrics effectively," IEEE Transactions on Computers IEEE USA, 55(9):1081-1088 (Sep. 2006).
Huss G. et al., "Spatial filtering efficiency of single-mode optical fibers for stellar interferometry applications: phenomenological and numerical study," Optics Communications, North-Holland Publishing Co., Amsterdam, NL, 244:209-217 (Sep. 23, 2004).
International Search Report for Great Britain Patent App. No. GB0607867.9, Aug. 22, 2006, 1 page.
International Search Report from International App. No. PCT/GB2005/000922 filed Mar. 9, 2005, 3 pages.
International Search Report for PCT/GB2007/002173 dated Sep. 19, 2007, 3 pages.
International Search Report and Written Report for PCT/GB2009/001702 dated Oct. 23, 2009, 12 pages.
International Search Report issued by UK Intellectual Property Office for GB0720673.3, dated Mar. 28, 2008, 2 pages.
Kirovski, Darko, "Toward an Automated Verification of Certificates of Authenticity," pp. 160-169 (2004).
Kravolec, "Plastic tag makes foolproof ID," Technology Research News, Oct. 2, 2002.
Kvasnik et al., "Image recognition using surface scattered light in a coherent optical processor," Image Processing and its Applications, University of Manchester Institute of Science and Technology UK, pp. 361-364 (1992).
Pappu et al., "Physical one-way functions," Science, American Association for the Advancement of Science, vol. 297. No. 5589, pp. 2026-2030 (2002).
Ravikanth, Pappu Srinivasa. "Physical One-Way Functions," pp. 3-154, Mar. 2001.
Schneier B., "Applied Cryptography. Protocols, Algorithms, and Source Code in C, Passage," Applied Cryptography, 2nd Ed., John Wiley & Sons, Inc., New York, p. 197 (1996).

(56) References Cited

OTHER PUBLICATIONS

Simmons, G.J. A survey of information authentication, in <i>Contemporary Cryptology, The Science of Information Integrity</i>, pp. 379-419 IEEE Press (1992).

Smalley, Eric, "Plastic Tag makes foolproof ID," Technology Research News, Oct. 2, 2002.

Smith et al., "Microstructure Based Indicia," Laboratories Escher Group, pp. 1-5 (1999).

UK Search Report for GB0812772.2 dated Nov. 6, 2008, 1 page.

UK Search Report for GB0812773 dated Mar. 2009, 2 pages.

Uk Search Report for GB0812773 dated Nov. 2008, 2 pages.

Van Renesse R.L., "Optical inspection techniques for security instrumentation," Proceedins of SPIE-The International Society for Optical Engineering, Vo. 2659, pp. 159-167 (Mar. 1996).

Wilkes, Sally, "Fighting Fraud; Document Biometrics," Materials World, vol. 12, No. 12, pp. 29-30 (Dec. 2004).

Zhang D et al., "Shape-based image retrieval using generic Fourier descriptor" Signal Processing. Image Communication, Ellsevier Science Publishers, Amsterdam, NL 17(10):825-848 (Nov. 2002).

Zwick/Roell—Zwick Materials testing—the new direction in extension measurement—optiXtens, 11 pages.

Agilent Technologies, "Agilent Data Sheet HEDS 1500," Agilent Technologies, www.digchip.com, 1999, 6 pages.

European Patent Office, Notice of Opposition for EP2374111, dated Nov. 4, 2013, 20 pages.

The International Bureau of WIPO, International Preliminary Report on Patentability and Written Opinion for PCT/GB2007/002173, dated Dec. 16, 2006, 7 pages.

Métois, Eric et al., "FiberFingerprint identification" In Proc. 3rd Workshop on Automatic Identification, Mar. 2002, pp. 147-154.

\* cited by examiner

Baseline

Paper tilted by 0.06 degrees

OPTIMISATION

This application is a U.S. national phase of International Application No. PCT/GB2010/051844 filed Nov. 4, 2010, which claims the benefit of priority to U.S. Provisional Application 61/259,946, filed Nov. 10, 2009, and UK Patent Application No. GB 0919664.3, filed Nov. 10, 2009, the disclosures of which are incorporated herein by reference in their entirety.

FIELD

The present invention relates to optimisation of the performance of a system for generating signatures from intrinsic properties of an article and for comparing such a signature to a previously stored signature for a valid, genuine or authentic article and in particular, but not exclusively, to use of a genetic optimisation method for managing the optimisation process.

BACKGROUND

In the fields of authenticating of physical articles it is known to rely upon an identifier for the article. An identifier based on a physical property of an unmodified surface of the article can be used (WO2005/088533). A system to implement article tracking and/or verification using such signatures can be a complex system involving equipment at multiple locations and depend upon a number of variable parameters.

The present invention has been conceived in the light of known drawbacks of existing systems.

SUMMARY

Viewed from a first aspect, the present invention provides a method for implementing a system for authentication of an article based upon a signature generated from a set comprising groups of data points collected when a plurality of regions of an intrinsic surface structure of an article are sequentially subjected to coherent light and the light scattered by the intrinsic surface structure is collected. For a given system implementation, the method comprises: determining a set of parameters which influence the performance of the system; determining a definition of system performance which can be affected by the set of parameters; producing an initial population of parameter value sets, each parameter set including a value for each parameter to be used in achieving a desired system performance; determining for each parameter value set a fitness value in terms of the system performance definition; identifying mating pairs of the population in accordance with the determined fitnesses; producing a new population by crossing the mating pairs; repeating the determining of a fitness value for each parameter value set, identifying of mating pairs and producing a new population until an end criterion is satisfied; and configuring the system in accordance with a selected one of the parameter sets from the final population. Thereby, a flexible and appropriate approach to system implementation can be followed which provides high efficiency in terms of the human time input and which provides high quality reliable setup parameter values to enable a reliable and efficient system implementation to result.

In some examples, the end criterion includes one or more of a fixed number of iterations, a fixed number of iterations following a given result event; and a behaviour pattern in the overall population fitness values. In some examples, the behaviour pattern is a convergent behaviour. Thus a flexible approach to determining when the final parameter determinations have been made is provided.

In some examples, the method further includes introducing a random mutation during or after the producing a new population. In some examples, the mutation is inconsistent between iterations. Thus a the implementation parameter values provide by the method can be of high quality and result in a reliable and efficient system implementation due to the avoidance of parameter value results corresponding to a false peak.

In some examples, the system comprises at least one record scanner operable to make a record signature for a known article, a database operable to store a record signature for a known article and a test scanner operable to make a signature for an article under test for comparison to one or more record signatures in the database. Thus the system implementation parameters can be provided across the entire range of elements involved in a given system implementation.

In some examples, each of the record scanner and the field scanner is operable to generate a signature for an article by: sequentially illuminating a plurality of regions of the article with a coherent beam; collecting a set comprising groups of data points from signals obtained when the coherent beam scatters from the different regions of the article, wherein different ones of the groups of data points relate to scatter from the respective different regions of the article; and determining a signature of the article from the set of groups of data points. Thus the parameter values provided can be appropriate to a system which generates and uses biometric type descriptors and/or identifiers for physical articles.

In some examples, the definition of system performance includes at least one of a distribution width of a set of cross-comparisons between article signatures, and a distribution spacing between cross-comparison results for comparisons between like and non-like articles. Thus the separation between non-match and match results for the biometric type descriptors and/or identifiers for the physical articles can be used as a guide to the optimal implementation parameter values.

In some examples, the set of parameters includes at least one parameter selected from the group consisting of a time domain filter order, a time domain filter rise and fall space, a space domain filter order, a space domain rise and fall space, a spatial resolution, a smoothing function, an encoder setting, a block size, a number of blocks, a fitting polynomial order, a stretch range, a standard deviation threshold, an initial positioning offset, a text removal filter setting, an image threshold, and a scale amplitude. Thus a variety of parameters can be considered and have vales determined therefore.

Viewed from another aspect, the present invention can provide a system for authentication of an article based upon a signature generated from a set comprising groups of data points collected when a plurality of regions of an intrinsic surface structure of an article are sequentially subjected to coherent light and the light scattered by the intrinsic surface structure is collected. The system can be configured in accordance with steps of: determining a set of parameters which influence the performance of the system; determining a definition of system performance which can be affected by the set of parameters; producing an initial population of parameter value sets, each parameter set including a value for each parameter to be used in achieving a desired system performance; determining for each parameter value set a fitness value in terms of the system performance definition; identifying mating pairs of the population in accordance with the determined fitnesses; producing a new population by crossing the mating pairs; repeating the determining of a fitness value for each parameter value set, identifying of mating pairs and producing a new population until an end criterion is satisfied;

and configuring the system in accordance with a selected one of the parameter sets from the final population. Thereby, a flexible and appropriate approach to system implementation can be followed which provides high efficiency in terms of the human time input and which provides high quality reliable setup parameter values to enable a reliable and efficient system implementation to result.

Further objects and advantages of the invention will become apparent from the following description and the appended claims.

BRIEF DESCRIPTION OF THE DRAWINGS

For a better understanding of the invention and to show how the same may be carried into effect reference is now made by way of example to the accompanying drawings in which.

Figure 1:
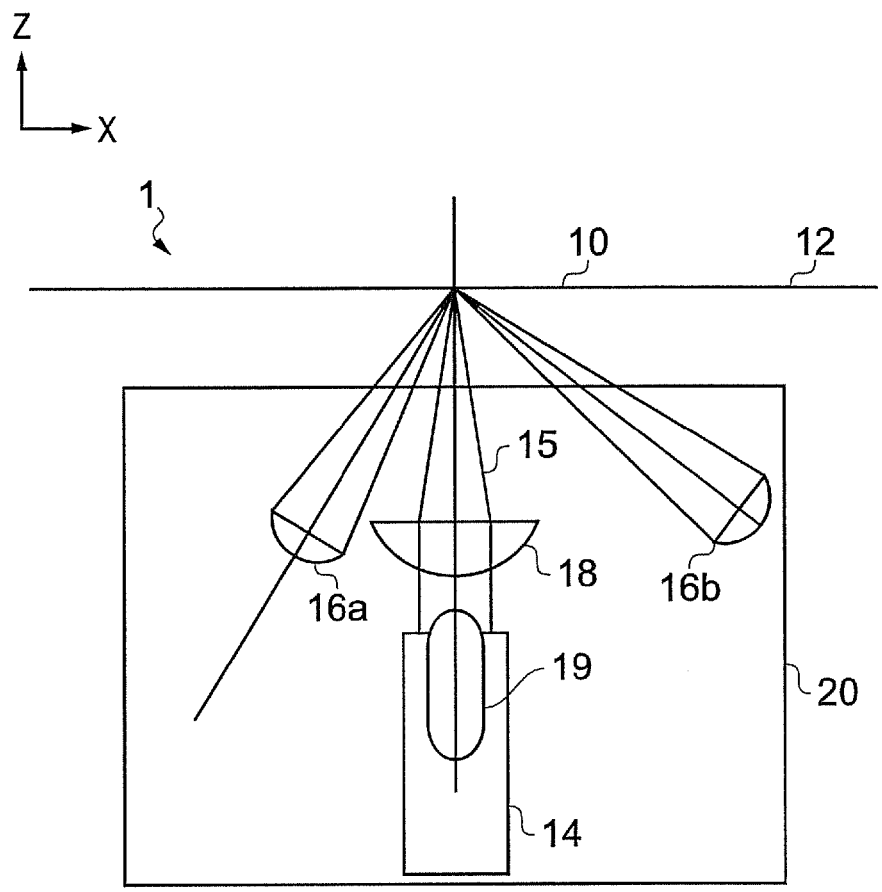
FIG. 1 shows a schematic side view of a reader apparatus.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

SPECIFIC DESCRIPTION

To provide an accurate method for uniquely identifying an article, it is possible to use a system which relies upon optical reflections from a surface of the article. An example of such a system will be described with reference to FIGS. 1 to 14.

The example system described herein is one developed and marketed by Ingenia Technology Ltd. This system is operable to analyse the random surface patterning of a paper, cardboard, plastic or metal article, such as a sheet of paper, an identity card or passport, a security seal, a payment card etc to uniquely identify a given article. This system is described in detail in a number of published patent applications, including GB0405641.2 filed 12 Mar. 2004 (published as GB2411954 14 Sep. 2005), GB0418138.4 filed 13 Aug. 2004 (published as GB2417707 8 Mar. 2006), US 60/601,464 filed 13 Aug. 2004, US 60/601,463 filed 13 Aug. 2004, US 60/610,075 filed 15 Sep. 2004, GB 0418178.0 filed 13 Aug. 2004 (published as GB2417074 15 Feb. 2006), U.S. 60/601,219 filed 13 Aug. 2004, GB 0418173.1 filed 13 Aug. 2004 (published as GB2417592 1 Mar. 2006), U.S. 60/601,500 filed 13 Aug. 2004, GB 0509635.9 filed 11 May 2005 (published as GB2426100 15 Nov. 2006), U.S. 60/679,892 filed 11 May 2005, GB 0515464.6 filed 27 Jul. 2005 (published as GB2428846 7 Feb. 2007), U.S. 60/702,746 filed 27 Jul. 2005, GB 0515461.2 filed 27 Jul. 2005 (published as GB2429096 14 Feb. 2007), U.S. 60/702,946 filed 27 Jul. 2005, GB 0515465.3 filed 27 Jul. 2005 (published as GB2429092 14 Feb. 2007), U.S. 60/702,897 filed 27 Jul. 2005, GB 0515463.8 filed 27 Jul. 2005 (published as GB2428948 7 Feb. 2007), U.S. 60/702,742 filed 27 Jul. 2005, GB 0515460.4 filed 27 Jul. 2005 (published as GB2429095 14 Feb. 2007), U.S. 60/702,732 filed 27 Jul. 2005, GB 0515462.0 filed 27 Jul. 2005 (published as GB2429097 14 Feb. 2007), U.S. 60/704,354 filed 27 Jul. 2005, GB 0518342.1 filed 8 Sep. 2005 (published as GB2429950 14 Mar. 2007), U.S. 60/715,044 filed 8 Sep. 2005, GB 0522037.1 filed 28 Oct. 2005 (published as GB2431759 2 May 2007), U.S. 60/731,531 filed 28 Oct. 2005, GB0526420.5 filed 23 Dec. 2005 (published as GB2433632 27 Jul. 2007), US 60/753,685 filed 23 Dec. 2005, GB0526662.2 filed 23 Dec. 2005, US 60/753,633 filed 23 Dec. 2005, GB0600828.8 filed 16 Jan. 2006 (published as GB2434442 25 Jul. 2007), US 60/761,870 filed 25 Jan. 2006, GB0611618.0 filed 12 Jun. 2006 (published as GB2440386 30 Jan. 2008), US 60/804,537 filed 12 Jun. 2006, GB0711461.4 filed 13 Jun. 2007 (published as GB2450131 17 Dec. 2008) and US 60/943,801 filed 13 Jun. 2006 (all invented by Cowburn et al.), the content of each and all of which is hereby incorporated hereinto by reference.

By way of illustration, a brief description of the method of operation of the Ingenia Technology Ltd system will now be presented.

FIG. 1 shows a schematic side view of a reader apparatus 1. The optical reader apparatus 1 is for measuring a signature from an article (not shown) arranged in a reading volume of the apparatus. The reading volume is formed by a reading aperture 10 which is a slit in a housing 12. The housing 12 contains the main optical components of the apparatus. The slit has its major extent in the x direction (see inset axes in the drawing). The principal optical components are a laser source 14 for generating a coherent laser beam 15 and a detector arrangement 16 made up of a plurality of k photodetector elements, where k=2 in this example, labelled 16a and 16b. The laser beam 15 is focused by a focussing arrangement 18 into an elongate focus extending in the y direction (perpendicular to the plane of the drawing) and lying in the plane of the reading aperture. In one example reader, the elongate focus has a major axis dimension of about 2 mm and a minor axis dimension of about 40 micrometers. These optical components are contained in a subassembly 20. In the illustrated example, the detector elements 16a, 16b are distributed either side of the beam axis offset at different angles from the beam axis to collect light scattered in reflection from an article present in the reading volume. In one example, the offset angles are −30 and +50 degrees. The angles either side of the beam axis can be chosen so as not to be equal so that the data points they collect are as independent as possible. However, in practice, it has been determined that this is not essential to the operation and having detectors at equal angles either side of the incident beam is a perfectly workable arrangement. The detector elements are arranged in a common plane. The photodetector elements 16a and 16b detect light scattered from an article placed on the housing when the coherent beam scatters from the reading volume. As illustrated, the source is mounted to direct the laser beam 15 with its beam axis in the z direction, so that it will strike an article in the reading aperture at normal incidence.

Generally the depth of focus is large, so that any differences in the article positioning in the z direction do not result in significant changes in the size of the beam in the plane of the reading aperture. In one example, the depth of focus is approximately ±2 mm which is sufficiently large to produce good results. In other arrangements, the depth of focus may be greater or smaller. The parameters, of depth of focus, numerical aperture and working distance are interdependent, resulting in a well known trade off between spot size and depth of focus. In some arrangements, the focus may be adjustable and in conjunction with a rangefinding means the focus may be adjusted to target an article placed within an available focus range.

In order to enable a number of points on the article to be read, the article and reader apparatus can be arranged for the incident beam and associated detectors to move relative to the article. This can be arranged by moving the article, the scanner assembly or both. In some examples, the article may be held in place adjacent the reader apparatus housing and the scanner assembly may move within the reader apparatus to cause this movement. Alternatively, the article may be moved past the scanner assembly. In other alternatives, both article and scanner may be kept stationary, while a directional focus means causes the coherent light beam to travel across the target. This may require the detectors to move with the light bean, or stationary detectors may be positioned so as to receive reflections from all incident positions of the light beam on the target.

Figure 2:
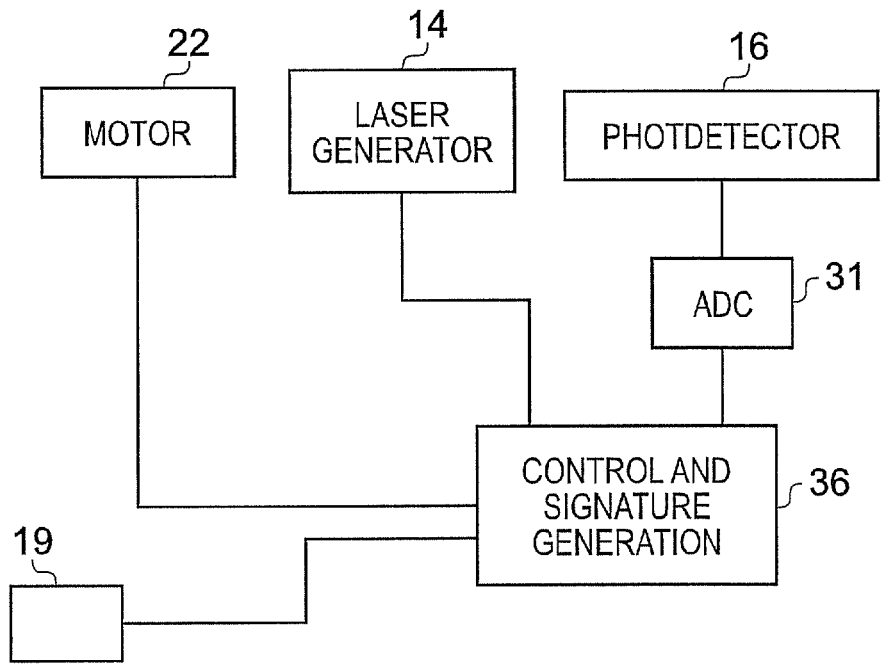
FIG. 2 shows a block schematic diagram of functional components of the reader apparatus.

FIG. 2 is a block schematic diagram of logical components of a reader apparatus as discussed above. A laser generator 14 is controlled by a control and signature generation unit 36. Optionally, a motor 22 may also be controlled by the control and signature generation unit 36. Optionally, if some form of motion detection or linearization means (shown as 19) is implemented to measure motion of the target past the reader apparatus, and/or to measure and thus account for non-linearities in there relative movement, this can be controlled using the control and signature generation unit 36. The reflections of the laser beam from the target surface scan area are detected by the photodetector 16. As discussed above, more than one photodetector may be provided in some examples. The output from the photodetector 16 is digitised by an analog to digital converter (ADC) 31 before being passed to the control and signature generation unit 36 for processing to create a signature for a particular target surface scan area. The ADC can be part of a data capture circuit, or it can be a separate unit, or it can be integrated into a microcontroller or microprocessor of the control and signature generation unit 36.

The control and signature generation unit 36 can use the laser beam present incidence location information to determine the scan area location for each set of photodetector reflection information. Thereby a signature based on all or selected parts of the scanned part of the scan area can be created. Where less than the entire scan area is being included in the signature, the signature generation unit 36 can simply ignore any data received from other parts of the scan area when generating the signature. Alternatively, where the data from the entire scan area is used for another purpose, such as positioning or gathering of image-type data from the target, the entire data set can be used by the control and signature generation unit 36 for that additional purpose and then kept or discarded following completion of that additional purpose.

As will be appreciated, the various logical elements depicted in FIG. 2 may be physically embodied in a variety of apparatus combinations. For example, in some situations, all of the elements may be included within a scan apparatus. In other situations, the scan apparatus may include only the laser generator 14, motor 22 (if any) and photodetector 16 with all the remaining elements being located in a separate physical unit or units. Other combinations of physical distribution of the logical elements can also be used. Also, the control and signature generation unit 36 may be split into separate physical units. For example, the there may be a first unit which actually controls the laser generator 14 and motor (if any), a second unit which calculates the laser beam current incidence location information, a third unit which identifies the scan data which is to be used for generating a signature, and a fourth part which actually calculates the signature.

It will be appreciated that some or all of the processing steps carried out by the ADC 31 and/or control and signature generation unit 36 may be carried out using a dedicated processing arrangement such as an application specific integrated circuit (ASIC) or a dedicated analog processing circuit. Alternatively or in addition, some or all of the processing steps carried out by the beam ADC 31 and/or control and signature generation unit 36 may be carried out using a programmable processing apparatus such as a digital signal processor or multi-purpose processor such as may be used in a conventional personal computer, portable computer, handheld computer (e.g. a personal digital assistant or PDA) or a smartphone. Where a programmable processing apparatus is used, it will be understood that a software program or programs may be used to cause the programmable apparatus to carry out the desired functions. Such software programs may be embodied onto a carrier medium such as a magnetic or optical disc or onto a signal for transmission over a data communications channel.

Figure 3:
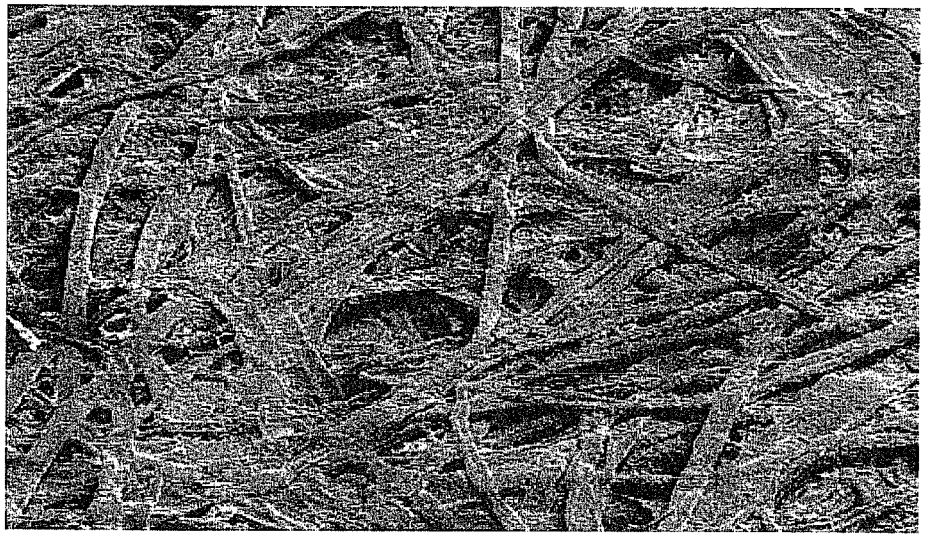
FIG. 3 is a microscope image of a paper surface.
Figure 4:
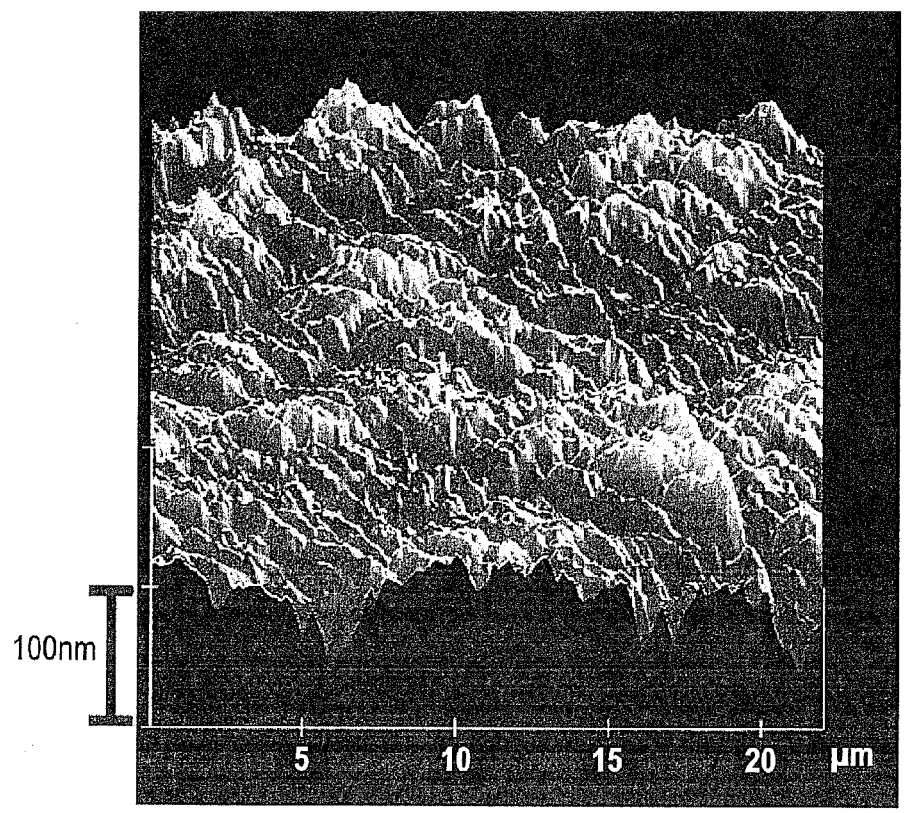
FIG. 4 shows an equivalent image for a plastic surface.

To illustrate the surface properties which the system of these examples can read, FIGS. 3 and 4 illustrate a paper and plastic article surface respectively.

FIG. 3 is a microscope image of a paper surface with the image covering an area of approximately 0.5×0.2 mm. This figure is included to illustrate that macroscopically flat surfaces, such as from paper, are in many cases highly structured at a microscopic scale. For paper, the surface is microscopically highly structured as a result of the intermeshed network of wood or other plant-derived fibres that make up paper. The figure is also illustrative of the characteristic length scale for the wood fibres which is around 10 microns. This dimension has the correct relationship to the optical wavelength of the coherent beam to cause diffraction and also diffuse scattering which has a profile that depends upon the fibre orientation. It will thus be appreciated that if a reader is to be designed for a specific class of goods, the wavelength of the laser can be tailored to the structure feature size of the class of goods to be scanned. It is also evident from the figure that the local surface structure of each piece of paper will be unique in that it depends on how the individual wood fibres are arranged. A piece of paper is thus no different from a specially created token, such as the special resin tokens or magnetic material deposits of the prior art, in that it has structure which is unique as a result of it being made by a process governed by laws of nature. The same applies to many other types of article.

FIG. 4 shows an equivalent image for a plastic surface. This atomic force microscopy image clearly shows the uneven surface of the macroscopically smooth plastic surface. As can be surmised from the figure, this surface is smoother than the paper surface illustrated in FIG. 3, but even this level of surface undulation can be uniquely identified using the signature generation scheme of the present examples.

In other words, it is essentially pointless to go to the effort and expense of making specially prepared tokens, when unique characteristics are measurable in a straightforward manner from a wide variety of every day articles. The data collection and numerical processing of a scatter signal that takes advantage of the natural structure of an article's surface (or interior in the case of transmission) is now described.

As is shown in FIG. 1 above, focussed coherent light reflecting from a surface is collected by a number of detectors 16. The detectors receive reflected light across the area of the detector. The reflected light contains information about the surface at the position of incidence of the light. As discussed above, this information may include information about surface roughness of the surface on a microscopic level. This information is carried by the reflected light in the form of the wavelength of features in the observed pattern of reflected light. By detecting these wavelength features, a fingerprint or signature can be derived based on the surface structure of the surface. By measuring the reflections at a number of positions on the surface, the fingerprint or signature can be based on a large sample of the surface, thereby making it easier, following re-reading of the surface at a later date, to match the signature from the later reading to the signature from the initial reading.

The reflected light includes information at two main angular wavelength or angular frequency regions. The high angular frequency (short wavelength) information is that which is traditionally known as speckle. This high angular frequency component typically has an angular periodicity of the order of 0.5 degrees. There is also low angular frequency (long wavelength) information which typically has an angular periodicity of the order of 15 degrees.

As mentioned above, each photodetector collects reflected light over a solid angle which will be called $\theta_n$. It is assumed in the present discussion that each photodetector collects light over a square or circular area. The solid angle of light collection can vary between different photodetectors 16. Each photodetector 16 measures reflected light having a minimum angle from the surface which will be called $\theta_r$. Thus the light detected by a given photodetector 16 includes the reflected beams having an angle relative to the surface of between $\theta_r$ and $\theta_r + \theta_n$. As will be discussed in greater detail below, there can be advantages in making a system resistant to spoofing in having detector channels separated by the largest possible angle. This would lead to making the angle $\theta_r$ as small as possible.

As will be appreciated, the solid angle $\theta_n$ over which a photodetector 16 detects reflected light may also be represented as a Numerical Aperture (NA) where:

$$NA = \sin(\phi)$$

where $\phi$ is the half-angle of the maximum cone of light that can enter or exit the detector. Accordingly, the numerical aperture of the detectors in the present example is:

$$NA = \sin(\theta_n/2)$$

Thus, a photodetector having a large numerical aperture will have the potential to collect a greater amount of light (i.e. more photons), but this has the effect of averaging more of the reflected information (speckle) such that the sum of all captured information speckle is weaker. However, the long angular wavelength component is less affected by the averaging than the short angular wavelength (traditional speckle) component, so this has the effect of the improving ratio of long wavelength to short wavelength reflected signal.

Although it is shown in FIG. 1 that the focussed coherent beam is normally incident on the surface, it will be appreciated that in practice it can be difficult to ensure perfectly normal incidence. This is especially true in circumstances where a low cost reader is provided, where positioning is performed by a user with little or no training or where positioning of the article is out of control of a user, such as on commercial processing environment including, for example conveyors transporting articles, and any circumstance where the distance from the reader to the article is such that there is no physical contact between reader and article. Thus, in reality it is very likely that the incident focussed coherent light beam will not strike the article from a perfect normal.

Figure 5A:
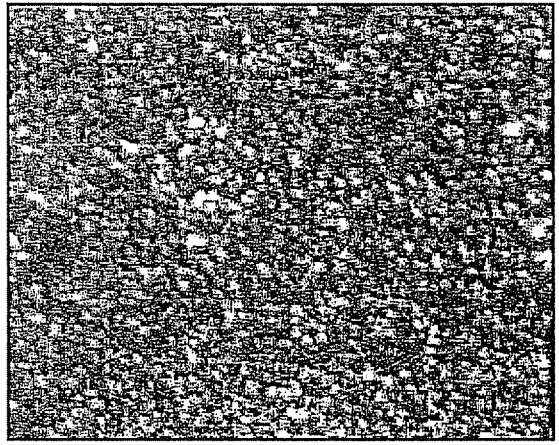
FIGS. 5a and 5b show the effect on reflection caused by non-normal incidence.
Figure 5B:
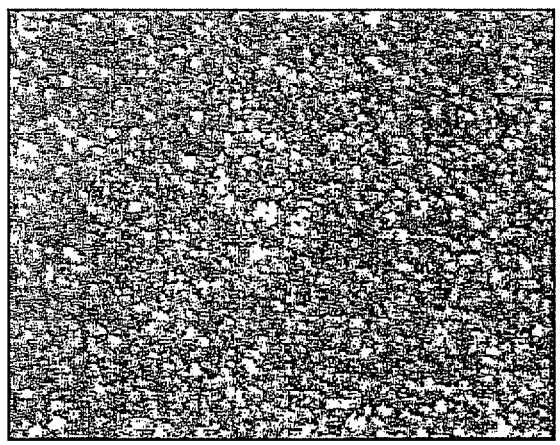

It has been found that altering the angle of incidence by only fractions of a degree can have a significant effect on the reflected speckle pattern from a surface. For example, FIG. 5a shows an image of a conventional speckle pattern from a piece of ordinary white paper such as might be used with a conventional printer or photocopier. FIG. 5b shows an image of the speckle pattern of that same piece of paper under identical illumination conditions with the piece of paper tilted by 0.06 degrees relative to its position in the image in FIG. 5a. It is immediately clear to any observer that the speckle pattern has changed significantly as a result of this extremely small angular perturbation in the surface. Thus, if a signature were to be generated from the each of the respective data sets from these two images, a cross-correlation between those two signatures would provide a result much lower than would normally be expected from a cross-correlation between two signatures generated from scanning the same target.

It has also been found that when the angle is repeatedly increased by a small amount and the measurements taken and cross-correlations performed between each new measurement and the baseline original measurement (with zero offset angle), that the cross-correlation result drops off rapidly as the offset angle starts to increase. However, as the angle increases beyond a certain point, the cross-correlation result saturates, causing a plot of cross-correlation result against offset angle to level off at an approximately constant cross-correlation value. This effect is provided by the low frequency component in the reflected light. What is happening is that the high frequency speckle component of the reflected light quickly de-couples as the perturbation in incident angle increases. However, once the angle increase by a certain amount, the effect of the traditional speckle (high frequency) component becomes less than the effect of the low frequency component. Thus, once the low frequency component becomes the most significant factor in the cross-correlation result, this component (which is much more incident angle tolerant) causes the cross-correlation result to saturate despite further increases in incident angle perturbation.

Figure 6:
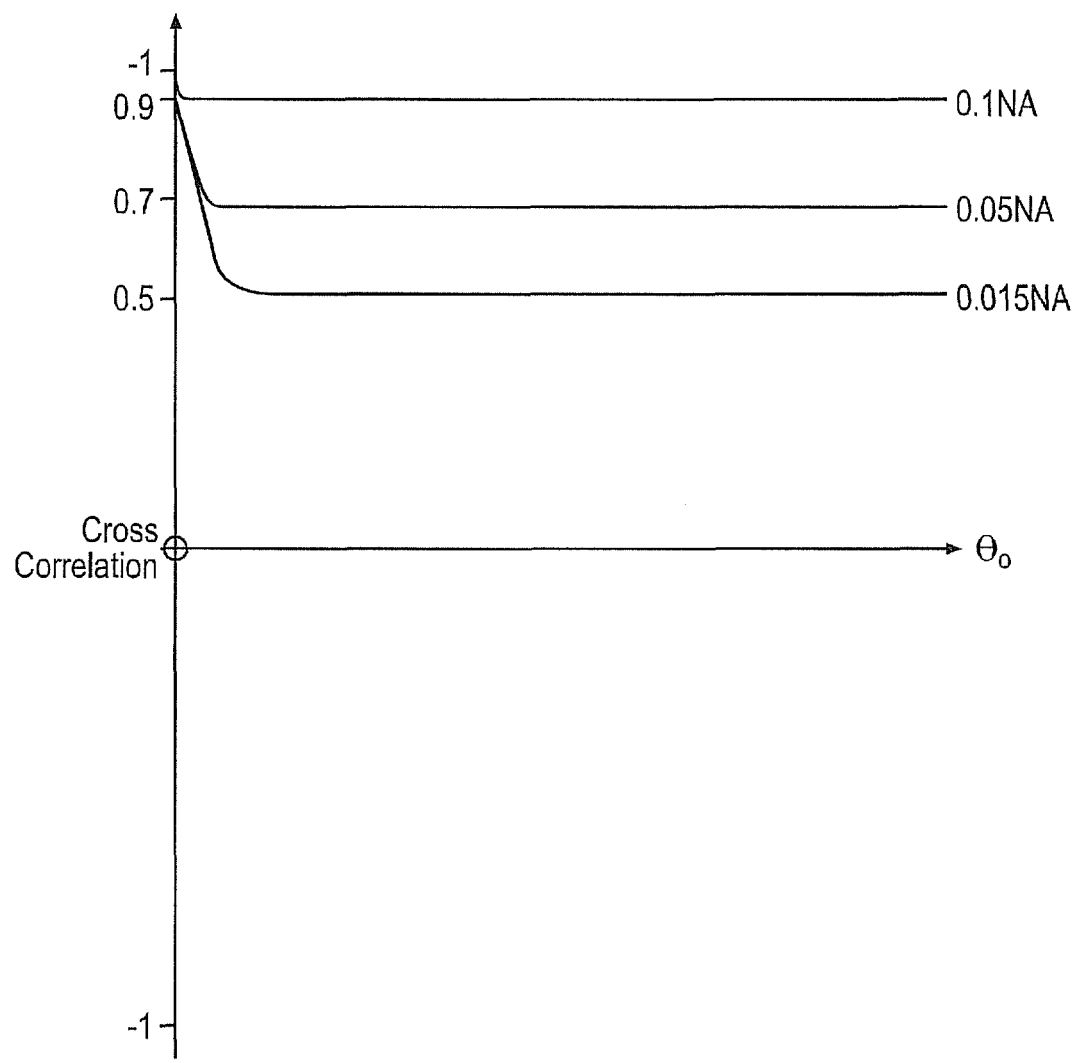
FIGS. 6 and 7 show the effect of detector numerical aperture on resistance to non-normal incidence.

This phenomenon is illustrated in FIG. 6, where a schematic plot of cross correlation result against offset angle is shown at various different numerical aperture values for the photodetector. As can be seen from FIG. 6, at a numerical aperture of 0.06 (solid angle of approximately 6.88 degrees) the cross correlation result drops off rapidly with increasing angle until a cross-correlation result of approximately 0.5 is reached. The cross-correlation result saturates at this value.

It has also been found that increasing the numerical aperture of the photodetector causes the low frequency component of the reflected light to take precedence over the high frequency component sooner in terms of incident angle perturbation. This occurs because over a larger solid angle (equivalent to numerical aperture) the effect of the low frequency component becomes greater relative to the high frequency "traditional speckle" component as this high frequency component is averaged out by the large "reading window".

Thus, as shown in FIG. 6, the curves representing higher numerical aperture saturate at respectively higher cross correlation result values. At a numerical aperture of 0.05 (full cone angle of approximately 5.7 degrees), the graph saturates at a cross correlation result of approximately 0.7. At a numerical aperture of 0.1 (full cone angle of approximately 11.4 degrees), the graph saturates at a cross correlation result of approximately 0.9.

Figure 7:
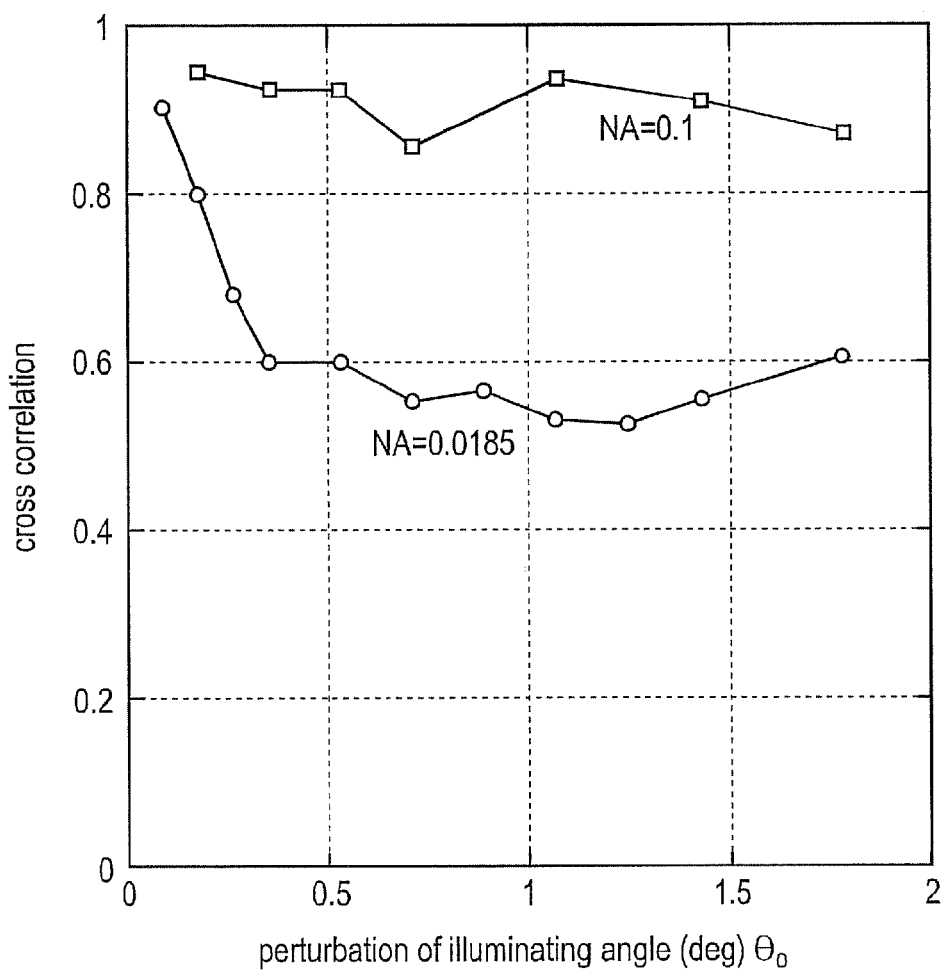

A plot of some experimental results demonstrating this phenomenon is shown in FIG. 7. These results were taken under identical illumination conditions on the same surface point of the same article, with the only alterations for each photodetector being there alteration in the incident light beam away from normal. The cross correlation result is from a cross-correlation between the collected information at each photodetector at each incident angle perturbation value and information collected with zero incident angle perturbation. As can be seen from FIG. 7, with a photodetector having a numerical aperture of 0.074 (solid angle of 8.48 degrees), the cross correlation result rapidly drops to 0.6 with an increase in incident angle perturbation from 0 to 0.5 degrees. However, once this level is reached, the cross correlation result stabilises in the range 0.5 to 0.6.

With a photodetector having a numerical aperture of 0.4 (solid angle of 47.16 degrees), the cross correlation result almost instantly stabilises around a value of approximately 0.9. Thus at this numerical aperture, the effect of speckle is almost negligible as soon as any deviation from a normal incident angle occurs.

Thus, it is apparent that a reader using a photodetector according to this technique can be made extremely resistant to perturbations in the incident angle of a laser light beam between different readings from the same surface point.

Figure 8:
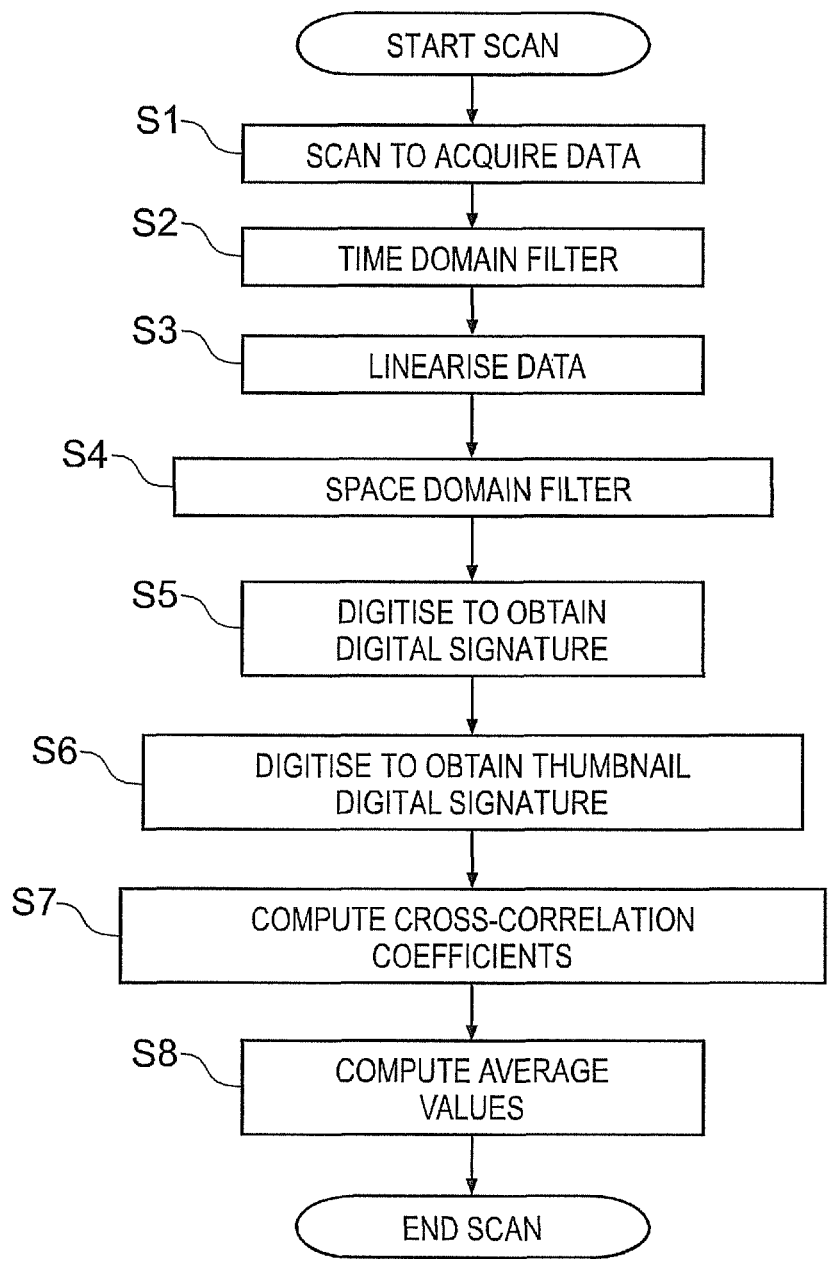
FIG. 8 shows a flow diagram showing how a signature of an article can be generated from a scan.

FIG. 8 shows a flow diagram showing how a signature of an article can be generated from a scan.

Step S1 is a data acquisition step during which the optical intensity at each of the photodetectors is acquired at a number of locations along the entire length of scan. Simultaneously, the encoder signal is acquired as a function of time. It is noted that if the scan motor has a high degree of linearisation accuracy (e.g. as would a stepper motor), or if non-linearities in the data can be removed through block-wise analysis or template matching, then linearisation of the data may not be required. Referring to FIG. 2 above, the data is acquired by the signature generator 36 taking data from the ADC 31. The number of data points per photodetector collected in each scan is defined as N in the following. Further, the value $a_k(i)$ is defined as the i-th stored intensity value from photodetector k, where i runs from 1 to N.

Step S2 is an optional step of applying a time-domain filter to the captured data. In the present example, this is used to selectively remove signals in the 50/60 Hz and 100/120 Hz bands such as might be expected to appear if the target is also subject to illumination from sources other than the coherent beam. These frequencies are those most commonly used for driving room lighting such as fluorescent lighting.

Step S3 performs alignment of the data. In some examples, this step uses numerical interpolation to locally expand and contract $a_k(i)$ so that the encoder transitions are evenly spaced in time. This corrects for local variations in the motor speed and other non-linearities in the data. This step can be performed by the signature generator 36.

In some examples, where the scan area corresponds to a predetermined pattern template, the captured data can be compared to the known template and translational and/or rotational adjustments applied to the captured data to align the data to the template. Also, stretching and contracting adjustments may be applied to the captured data to align it to the template in circumstances where passage of the scan head relative to the article differs from that from which the template was constructed. Thus if the template is constructed using a linear scan speed, the scan data can be adjusted to match the template if the scan data was conducted with non-linearities of speed present.

Step S4 applies an optional signal intensity capping to address a particular issue which occurs with articles having, for example, highly printed surfaces, including surfaces with text printing and surfaces with halftone printing for example. The issue is that there is a tendency for the non-match results to experience an increase in match score thereby reducing the separation between a non-match result and a match result.

Figure 10:
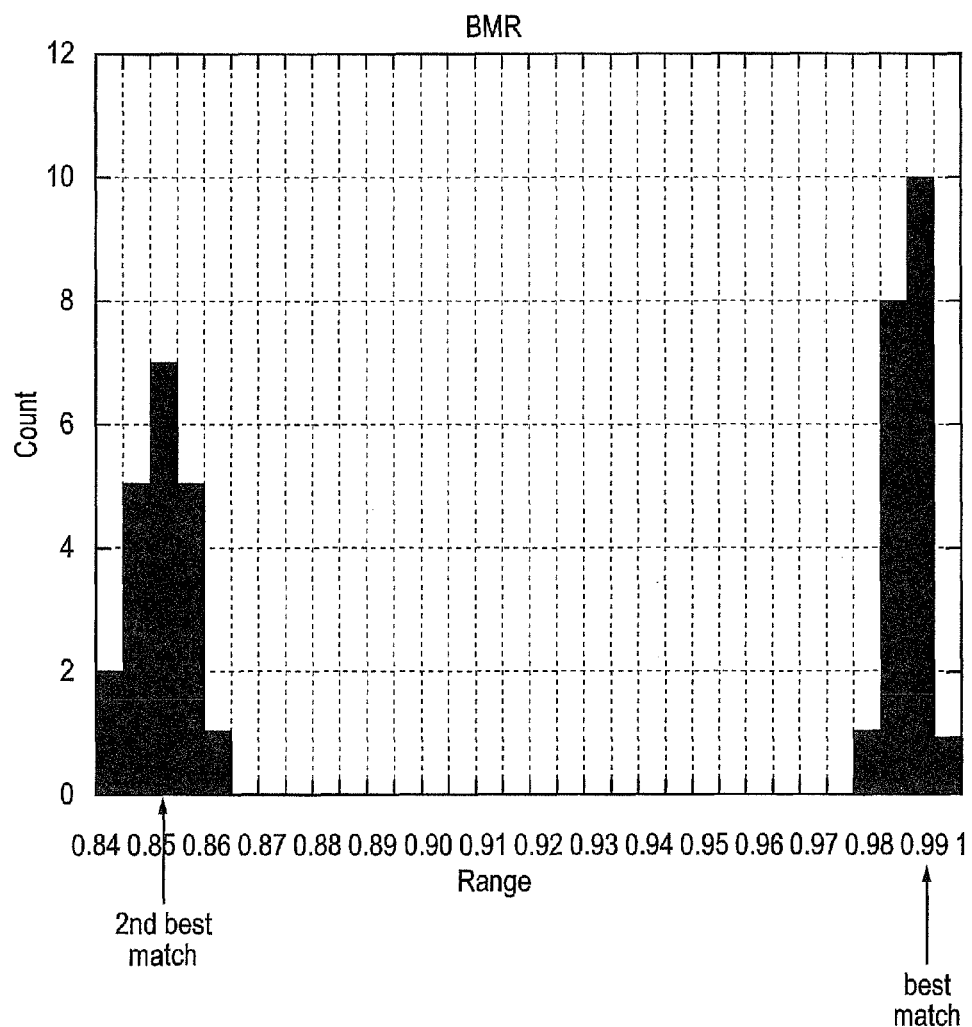
FIG. 10 shows schematically the effect of high contrast transitions on bit match ratios.

This is caused by the non-random effects of a sudden contrast change on the scanned surface in relation to the randomness of each bit of the resulting signature. In simple terms, the sudden contrast change causes a number of non-random data bits to enter the signature and these non-random bits therefore match one-another across scans of similarly printed or patterned articles. FIG. 10 illustrates this process in more detail.

Figure 9A:
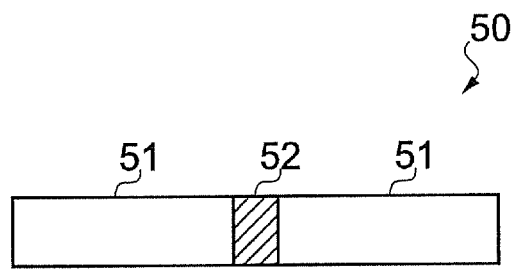
FIGS. 9a to 9c show schematically the effect of high contrast transitions on collected data.
Figure 9B:
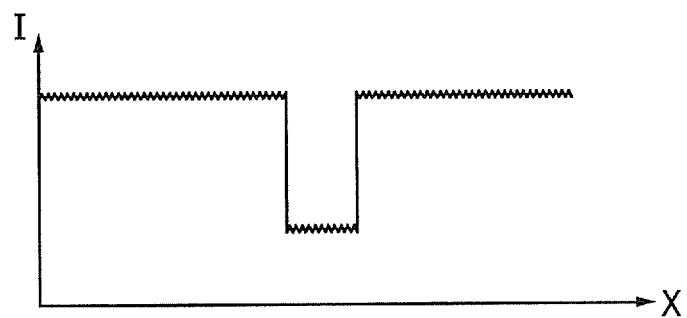

FIG. 9a shows a scan area 50 on an article, the scan area has two areas 51 which have a first surface colour and an area 52 with a second surface colour. The effect of this surface colour transition is shown in FIG. 9b where the intensity of the reflected signal captured by the scan apparatus is plotted along the length of the scan area. As can be seen, the intensity follows a first level when the first surface colour is present and a second level when the second surface colour is present. At each of the first and second levels, small variations in signal intensity occur. These small variations are the information content from which the signature is derived.

Figure 9C:
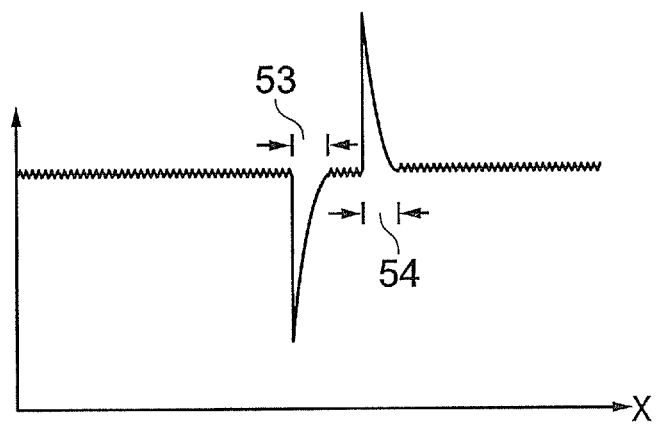

The problem that the step change between the first and second levels in FIG. 9b actually causes in the resulting signature is illustrated by FIG. 9c. FIG. 9c shows the intensity data from FIG. 9b after application of an AC filter (such as the space domain band-pass filter discussed below with respect to step S4). From FIG. 9c it is clear that, even with a high order filter such as a $2^{nd}$ order filter, after each sudden transition in surface pattern on the scan area a region where the small intensity variation is lost occurs. Thus, for each data bit position in the region 53, the value of the data bit that ends up in the signature will be a zero, irrespective of the small variations in intensity that actually occurred at those positions. Likewise, for each data bit position in the region 54, the value of the data bit that ends up in the signature will be a one, irrespective of the small variations in intensity that actually occurred at those positions.

As two similar articles can be expected to have nominally identical surface printing or patterning over a scan region, all signatures for such articles can be expected to have approximately the same regions of all one and/or all zero data bits within the signature at the positions corresponding to the step changes in the surface pattern/print/colour. These regions therefore cause an artificially increased comparison result value for comparisons between different articles, reducing the separation between a match result and a non-match result. This reduced separation is illustrated in FIG. 13, where it can be seen that the peak for comparisons between different scans of a single article (i.e. a match result) is centred at a bit match ratio of around 99%, whereas the peak for the second best match where a comparison is performed against scans of different articles is centred at a bit match ratio of around 85%. Under normal circumstances, where no such surface patterning effects occur, the non-match peak would be expected to be much closer to 50%.

As is noted above, a first approach to minimising the data loss caused by such transitions involves using a high order filter to minimise the recovery time and thus minimise the number of signature bits that are affected by each scan surface transition.

Figure 11A:
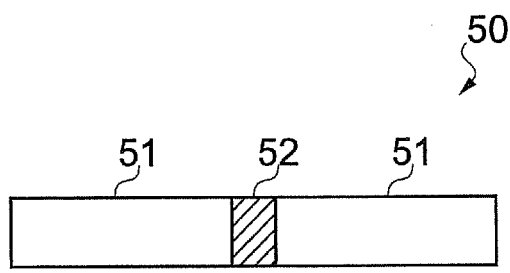
FIGS. 11a to 11c show schematically the mitigation of the effect of high contrast transitions on collected data by transition capping.
Figure 11B:
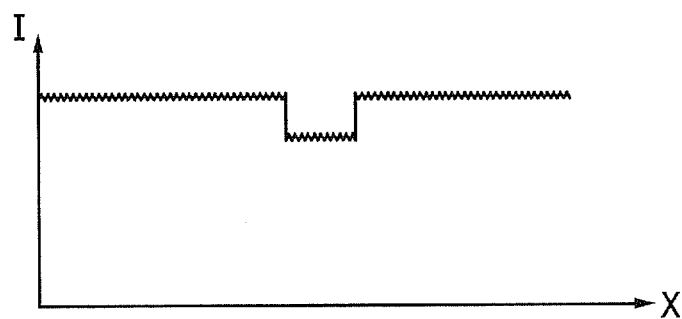
Figure 11C:
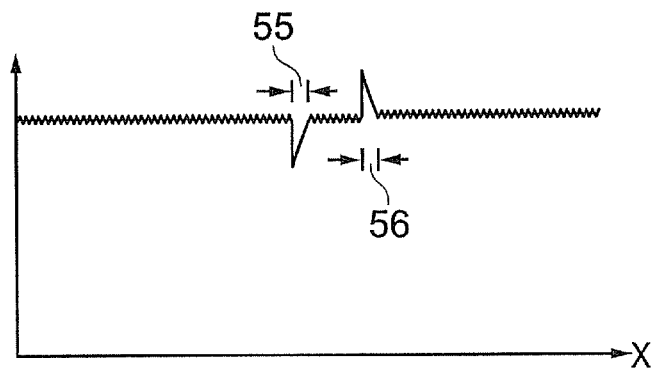

As will be described hereafter, a more involved approach can be taken to minimising the impact of such scan surface transitions on the bits of a signature derived from a scan of that scan surface. Specifically, a system can be implemented to detect that an intensity variation is occurring that is too large to be one of the small variations that represents the surface texture or roughness which leads to the signature. If such a transition is detected, the magnitude of the transition can be chopped or capped before the AC filter is applied to further reduce the filter recovery time. This is illustrated in FIG. 11. FIG. 11a is identical to FIG. 9a, and shows the scan region with the patterned areas. FIG. 11b shows the capped magnitude of the transitions between the patterned areas, and FIG. 11c shows that the regions 55 and 56 which result in all one and all zero data bits are much smaller relative to the corresponding regions 53 and 54 in FIG. 9c. This then reduces the number of bits in the signature which are forced to adopt a zero or one value as a direct result of a surface pattern transition without any reference to the small variations that the remainder of the signature is based upon.

One of the most straightforward ways to detect such transitions is to know when they are coming such as by having a template against which the scan data can be compared to cap the transitions automatically at certain points along the scan length. This approach has two drawbacks, that the template needs to be aligned to the scan data to allow for mispositioning of the scanner relative to the article, and that the scanner needs to know in advance what type of article is to be scanned so as to know what template to use.

Another way to detect such transitions is to use a calculation based on, for example, the standard deviation to spot large transitions. However, such a approach typically has trouble with long periods without a transition and can thus cause errors to be introduced where a scanned article doesn't have any/many transitions.

Figure 12:
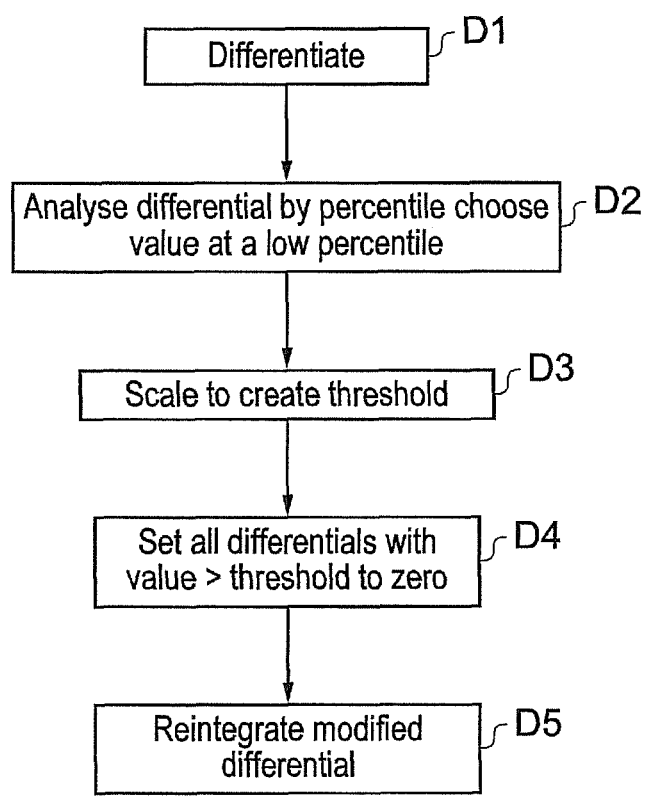
FIG. 12 shows a flow diagram showing how transition capping can be performed.

To address the defects in such approaches, the following technique can be used to enable a system which works equally well whether or not a scan area includes transitions in printing/patterning and which requires no advance knowledge of the article to be scanned. Thus, in the present example, the approach taken in optional step S4 is shown in FIG. 12.

Starting at step D1, the intensity values are differentiated to produce a series of differential values. Then, at step D2, the differential values are analysed by percentile to enable a value to be chosen at a low value. In the present example, the $50^{th}$ percentile may be conveniently used. Other percentile values around or below the $50^{th}$ may also be used.

Step D3 then creates a threshold by scaling the value at the chosen percentile by a scaling factor. The scaling factor can be derived empirically, although one scaling factor can be applicable to a wide range of surface material types. In the present examples, a scaling factor of 2.5 is used for many different surface material types including papers, cardboards, glossy papers and glossy cardboards.

Then, at step D4, all of the differential values are compared the threshold. Any differentials with a value greater than the threshold are set to a zero value. Once the differential values have been threshold checked, the modified differentials are re-integrated at step D5.

In the present example, all of these steps are carried out after conversion of the analogue data from the photodetectors to multilevel digital values. In an example where the photodetectors output a digital intensity signal rather than an analogue signal, no digitisation would be necessary.

This system therefore spots the large transitions which are too large to be the surface texture/roughness response and caps those transitions in order to avoid the texture/roughness response data being masked by the large transition.

Figure 13A:
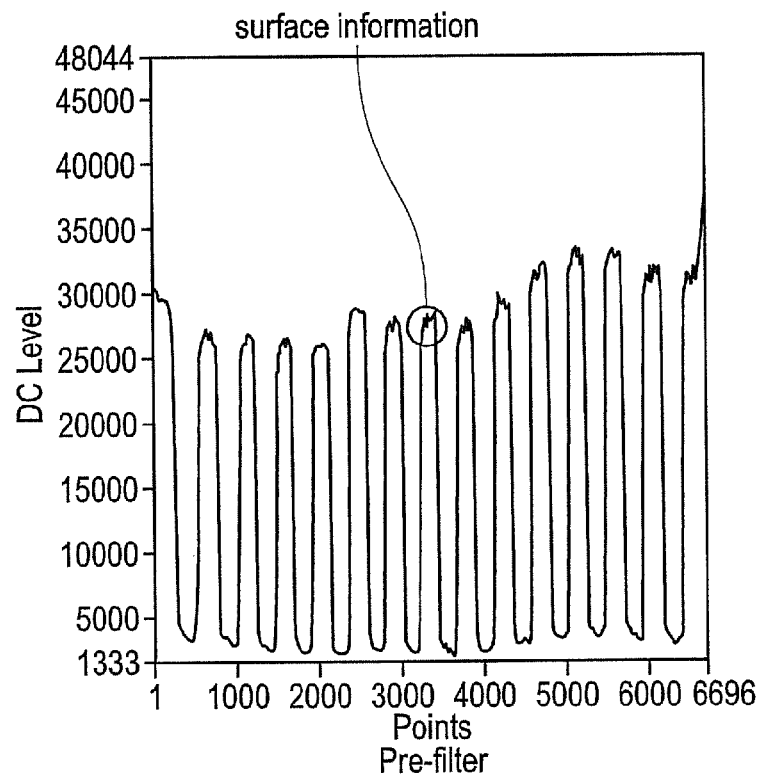
FIGS. 13a and 13b show the effect of transition capping on data from a surface with a large number of high magnitude transitions.
Figure 13B:
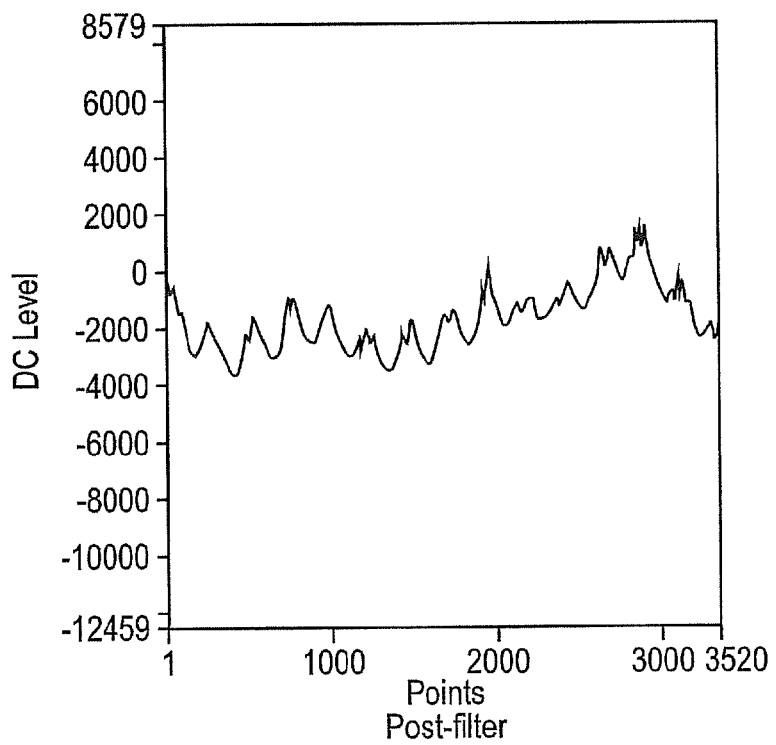

The effects of step S4 on data from a highly printed surface are illustrated in FIGS. 13a and 13b. FIG. 13a shows the data immediately before carrying out optional step S4, for data retrieved from a surface with a series of high contrast stripes transverse to the scan direction. The same data set, after processing by step S4 is shown in FIG. 13b, where it can be seen that the amount of surface information preserved is high despite the high contrast transitions.

Figure 14A:
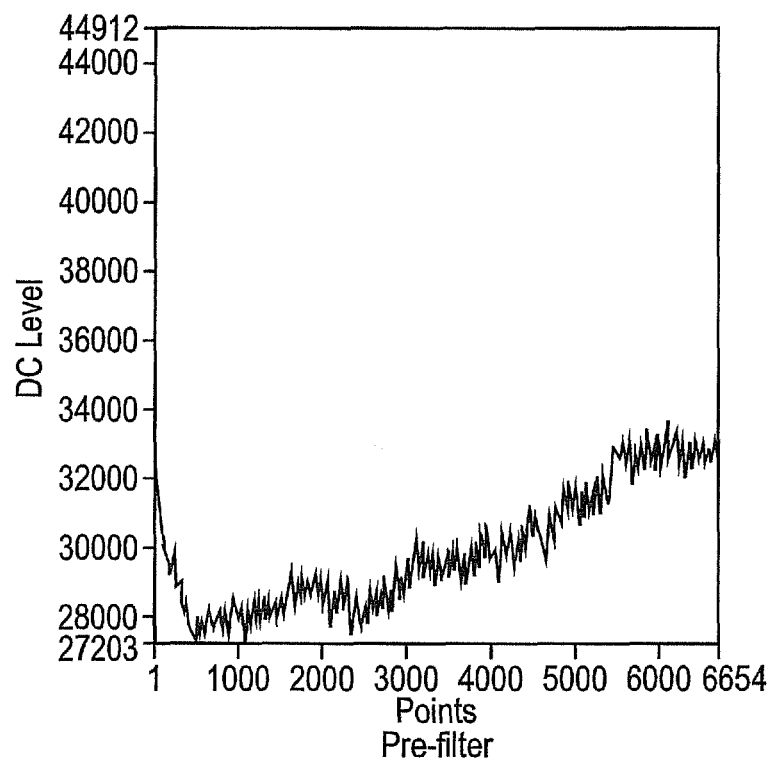
FIGS. 14a and 14b show the effect of transition capping on data from a surface without high magnitude transitions.
Figure 14B:
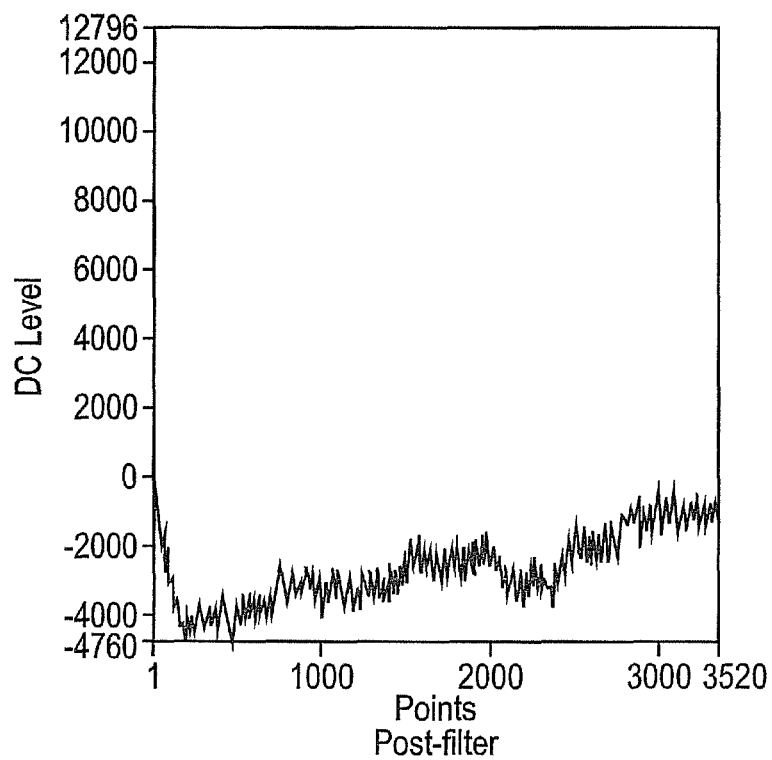

By way of comparison, FIGS. 14a and 14b illustrate that the system implemented in S4 does not cause problems in data without high contrast printed transitions. FIG. 14a shows the data immediately before carrying out step S4, for data retrieved from a plain surface. The same data set, after processing by step S4 is shown in FIG. 14b, where it can be seen that the amount of surface information is not reduced despite the carrying out of the process of S4.

Step S5 applies a space-domain band-pass filter to the captured data. This filter passes a range of wavelengths in the x-direction (the direction of movement of the scan head). The filter is designed to maximise decay between samples and maintain a high number of degrees of freedom within the data. With this in mind, the lower limit of the filter passband is set to have a fast decay. This is required as the absolute intensity value from the target surface is uninteresting from the point of view of signature generation, whereas the variation between areas of apparently similar intensity is of interest. However, the decay is not set to be too fast, as doing so can reduce the randomness of the signal, thereby reducing the degrees of freedom in the captured data. The upper limit can be set high; whilst there may be some high frequency noise or a requirement for some averaging (smearing) between values in the x-direction (much as was discussed above for values in the y-direction), there is typically no need for anything other than a high upper limit. In some examples a $2^{nd}$ order filter can be used. In one example, where the speed of travel of the laser over the target surface is 20 mm per second, the filter may have an impulse rise distance 100 microns and an impulse fall distance of 500 microns.

Instead of applying a simple filter, it may be desirable to weight different parts of the filter. In one example, the weighting applied is substantial, such that a triangular passband is created to introduce the equivalent of realspace functions such as differentiation. A differentiation type effect may be useful for highly structured surfaces, as it can serve to attenuate correlated contributions (e.g. from surface printing on the target) from the signal relative to uncorrelated contributions.

Step S6 is a digitisation step where the multi-level digital signal (the processed output from the ADC) is converted to a bi-state digital signal to compute a digital signature representative of the scan. The digital signature is obtained in the present example by applying the rule: $a_k(i)$>mean maps onto binary '1' and $a_k(i)$<=mean maps onto binary '0'. The digitised data set is defined as $d_k(i)$ where i runs from 1 to N. The signature of the article may advantageously incorporate further components in addition to the digitised signature of the intensity data just described. These further optional signature components are now described.

Step S7 is an optional step in which a smaller 'thumbnail' digital signature is created. In some examples, this can be a realspace thumbnail produced either by averaging together adjacent groups of m readings, or by picking every cth data point, where c is the compression factor of the thumbnail. The latter may be preferable since averaging may disproportionately amplify noise. In other examples, the thumbnail can be based on a Fast Fourier Transform of some or all of the signature data. The same digitisation rule used in Step S5 is then applied to the reduced data set. The thumbnail digitisation is defined as $t_k(i)$ where i runs 1 to N/c and c is the compression factor.

Step S8 is an optional step applicable when multiple detector channels exist (i.e. where k>1). The additional component is a cross-correlation component calculated between the intensity data obtained from different ones of the photodetectors. With 2 channels there is one possible cross-correlation coefficient, with 3 channels up to 3, and with 4 channels up to 6 etc. The cross-correlation coefficients can be useful, since it has been found that they are good indicators of material type. For example, for a particular type of document, such as a passport of a given type, or laser printer paper, the cross-correlation coefficients always appear to lie in predictable ranges. A normalised cross-correlation can be calculated between $a_k(i)$ and $a_l(i)$, where k≠l and k,l vary across all of the photodetector channel numbers. The normalised cross-correlation function is defined as:

$$\Gamma(k, l) = \frac{\sum_{i=1}^{N} a_k(i)a_l(i)}{\sqrt{\left(\sum_{i=1}^{N} a_k(i)^2\right)\left(\sum_{i=1}^{N} a_l(i)^2\right)}}$$

Another aspect of the cross-correlation function that can be stored for use in later verification is the width of the peak in the cross-correlation function, for example the full width half maximum (FWHM). The use of the cross-correlation coefficients in verification processing is described further below.

Step S9 is another optional step which is to compute a simple intensity average value indicative of the signal intensity distribution. This may be an overall average of each of the mean values for the different detectors or an average for each detector, such as a root mean square (rms) value of $a_k(i)$. If the detectors are arranged in pairs either side of normal incidence as in the reader described above, an average for each pair of detectors may be used. The intensity value has been found to be a good crude filter for material type, since it is a simple indication of overall reflectivity and roughness of the sample. For example, one can use as the intensity value the unnormalised rms value after removal of the average value, i.e. the DC background. The rms value provides an indication of the reflectivity of the surface, in that the rms value is related to the surface roughness.

The signature data obtained from scanning an article can be compared against records held in a signature database for verification purposes and/or written to the database to add a new record of the signature to extend the existing database and/or written to the article in encoded form for later verification with or without database access.

A new database record will include the digital signature obtained in Step S6 as well as optionally its smaller thumbnail version obtained in Step S7 for each photodetector channel, the cross-correlation coefficients obtained in Step S8 and the average value(s) obtained in Step S9. Alternatively, the thumbnails may be stored on a separate database of their own optimised for rapid searching, and the rest of the data (including the thumbnails) on a main database.

Figure 15:
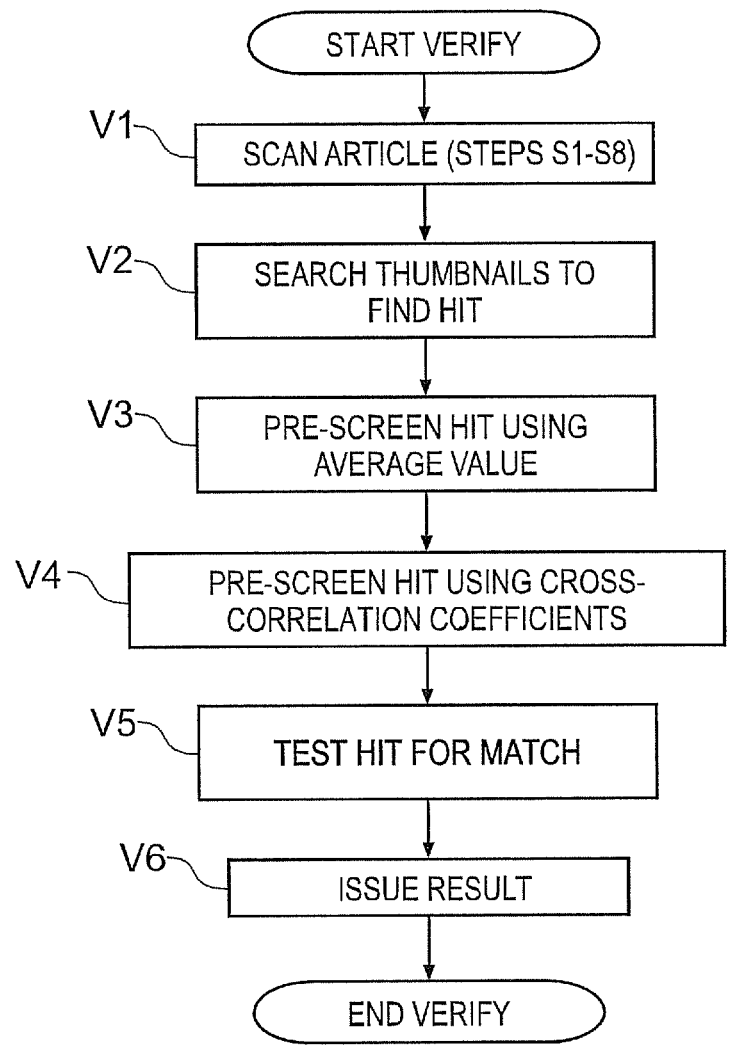
FIG. 15 is a flow diagram showing how a signature of an article obtained from a scan can be verified against a signature database.

FIG. 15 is a flow diagram showing how a signature of an article obtained from a scan can be verified against a signature database.

In a simple implementation, the database could simply be searched to find a match based on the full set of signature data. However, to speed up the verification process, the process of the present example uses the smaller thumbnails and pre-screening based on the computed average values and cross-correlation coefficients as now described. To provide such a rapid verification process, the verification process is carried out in two main steps, first using the thumbnails derived from the amplitude component of the Fourier transform of the scan data (and optionally also pre-screening based on the computed average values and cross-correlation coefficients) as now described, and second by comparing the scanned and stored full digital signatures with each other.

Verification Step V1 is the first step of the verification process, which is to scan an article according to the process described above, i.e. to perform Scan Steps S1 to S8. This scan obtains a signature for an article which is to be validated against one or more records of existing article signatures Verification Step V2 seeks a candidate match using the thumbnail derived from the Fourier transform amplitude component of the scan signal, which is obtained as explained above with reference to Scan Step S6. Verification Step V2 takes each of the thumbnail entries and evaluates the number of matching bits between it and $t_k(i+j)$, where j is a bit offset which is varied to compensate for errors in placement of the scanned area. The value of j is determined and then the thumbnail entry which gives the maximum number of matching bits. This is the 'hit' used for further processing. A variation on this would be to include the possibility of passing multiple candidate matches for full testing based on the full digital signature. The thumbnail selection can be based on any suitable criteria, such as passing up to a maximum number of, for example 10 or 100, candidate matches, each candidate match being defined as the thumbnails with greater than a certain threshold percentage of matching bits, for example 60%. In the case that there are more than the maximum number of candidate matches, only the best candidates are passed on. If no candidate match is found, the article is rejected (i.e. jump to Verification Step V6 and issue a fail result).

This thumbnail based searching method employed in the present example delivers an overall improved search speed, for the following reasons. As the thumbnail is smaller than the full signature, it takes less time to search using the thumbnail than using the full signature. Where a realspace thumbnail is used, the thumbnail needs to be bit-shifted against the stored thumbnails to determine whether a "hit" has occurred, in the same way that the full signature is bit-shifted against the stored signature to determine a match. The result of the thumbnail search is a shortlist of putative matches, each of which putative matches can then be used to test the full signature against.

Where the thumbnail is based on a Fourier Transform of the signature or part thereof, further advantages may be realised as there is no need to bit-shift the thumbnails during the search. A pseudo-random bit sequence, when Fourier transformed, carries some of the information in the amplitude spectrum and some in the phase spectrum. Any bit shift only affects the phase spectrum, however, and not the amplitude spectrum. Amplitude spectra can therefore be matched without any knowledge of the bit shift. Although some information is lost in discarding the phase spectrum, enough remains in order to obtain a rough match against the database. This allows one or more putative matches to the target to be located in the database. Each of these putative matches can then be compared properly using the conventional real-space method against the new scan as with the realspace thumbnail example.

Verification Step V3 is an optional pre-screening test that is performed before analysing the full digital signature stored for the record against the scanned digital signature. In this pre-screen, the rms values obtained in Scan Step S8 are compared against the corresponding stored values in the database record of the hit. The 'hit' is rejected from further processing if the respective average values do not agree within a pre-defined range. The article is then rejected as non-verified (i.e. jump to Verification Step V6 and issue fail result).

Verification Step V4 is a further optional pre-screening test that is performed before analysing the full digital signature. In this pre-screen, the cross-correlation coefficients obtained in Scan Step S7 are compared against the corresponding stored values in the database record of the hit. The 'hit' is rejected from further processing if the respective cross-correlation coefficients do not agree within a predefined range. The article is then rejected as non-verified (i.e. jump to Verification Step V6 and issue fail result).

Another check using the cross-correlation coefficients that could be performed in Verification Step V4 is to check the width of the peak in the cross-correlation function, where the cross-correlation function is evaluated by comparing the value stored from the original scan in Scan Step S7 above and the re-scanned value:

$$\Gamma_{k,l}(j) = \frac{\sum_{i=1}^{N} a_k(i) a_l(i+j)}{\sqrt{\left(\sum_{i=1}^{N} a_k(i)^2\right)\left(\sum_{i=1}^{N} a_l(i)^2\right)}}$$

If the width of the re-scanned peak is significantly higher than the width of the original scan, this may be taken as an indicator that the re-scanned article has been tampered with or is otherwise suspicious. For example, this check should beat a fraudster who attempts to fool the system by printing a bar code or other pattern with the same intensity variations that are expected by the photodetectors from the surface being scanned.

Verification step V5 performs a test to determine whether the putative match identified as a "hit" is in fact a match. In the present example, this test is self-calibrating, such that it avoids signature loss caused by sudden transitions on the scanned surface (such as printed patterns causing step changes in reflected light). This provides simpler processing and avoids the potential for loss of a significant percentage of the data which should make up a signature due to printing or other patterns on an article surface.

As has been described above with reference to step S4 and FIGS. 9 to 14, actions can be taken at the signature generation stage to limit the impact of surface patterning/printing on authentication/validation match confidence. In the present examples, an additional approach can be taken to minimise the impact upon the match result of any data bits within the signature which have been set by a transition effect rather than by the roughness/texture response of the article surface. This can be carried out whether or not the transition capping approach described above with reference to FIGS. 9 to 14 is performed.

Thus, in step V5, after the shortlist of hits has been complied using the thumbnail search and after the optional pre-screening of V4, a number of actions are carried out.

Firstly, a full signature comparison is performed between the record signature for each of the shortlist signatures and the test signature to select the signature with the best overall match result. This is selected as the best match signature. To aid in establishing whether the best match signature is actually a match result or is just a relatively high scoring non-match, a measure of the randomness of the bits of the signature is used to weight the cross-correlation result for the best match signature.

To establish the measure of the randomness of the bits in the signature, the best match signature is cross-correlated with the record signature for the other signatures in the shortlist identified by the thumbnails. From a sliding cross-correlation of each shortlist signature against the best match signature, a best result position can be found for each of those shortlist signatures against the best match signature. Then, the number of times that each bit value of the best match signature also occurs in the best result position of each of the shortlist signatures is measured.

This measured value is representative of the randomness of each bit within the best match signature. For example, if a given bit value is the same in approximately half of the shortlist signatures, then the bit is probably random, whereas if the given bit value is the same in approximately 90% of the shortlist signatures, then the bit is probably not random. To quantify this measure, the present examples define and use a bit utility ratio.

$$BitUtilityRatio \begin{aligned} &= 4(1 - AverageBitBMR)^2 \\ &\quad AveragBitBMR \geq 0.5 \\ &= 1 \\ &\quad AveragBitBMR < 0.5 \end{aligned}$$

This provides that for bits exhibiting a good level of randomness, a Bit Utility Ratio of or approaching 1 will be applied, and for bits exhibiting low level of randomness, a Bit Utility Ratio of or approaching zero will be applied. Referring again to the examples above, if a given bit value is the same in approximately half of the shortlist signatures (AverageBit-BMR=0.5), then the Bit Utility Ratio=1, whereas if the given bit value is the same in approximately 90% of the shortlist signatures (AverageBitBMR=0.9), then the Bit Utility Ratio is 0.04.

The Bit Utility Ratio calculated for each bit of the best match signature is then used to weight the cross-correlation result for the comparison between the test signature and the best match signature. Thus, instead of simply summing the comparison result for each bit comparison in the cross-correlation as would conventionally be performed, the Bit Utility Ratio for each bit is used to weight each bit result before the bit results are summed. Thus, whereas the cross-correlation sum result is defined, when no weighting is applied as:

$$BMR = \frac{\sum_i f(i) \otimes g(i)}{\sum_i 1}$$

where f(i) represents the $i^{th}$ value of the test signature and g(i) represents the $i^{th}$ value of the record signature; the cross-correlation sum result is defined, when using the Bit Utility Ratio (BUR) as a weighting, as:

$$CorrectedBMR = \frac{\sum_i f(i) \otimes g(i) \cdot BUR(i)}{\sum_i BUR(i)}$$

where BUR(i) represents the Bit Utility Ratio for the $i^{th}$ bit of the record signature.

Figure 16:
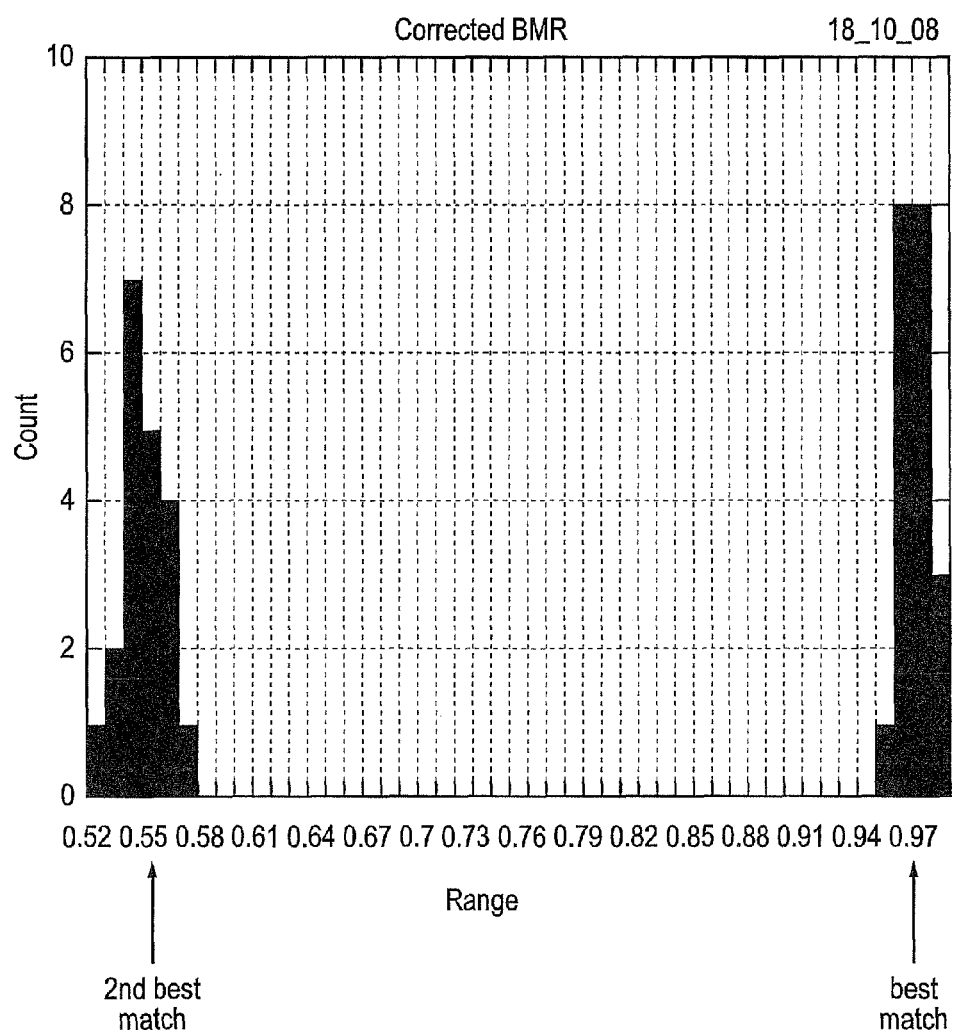
FIG. 16 shows schematically how the effects of high contrast transitions on bit match ratios can be mitigated.

This corrected Bit Match Ratio can then be used to assess whether the best match record signature is in fact taken form the same article as the test signature. FIG. 16 shows, by way of comparison with FIG. 10, that the peak for comparisons between different scans of a single article (i.e. a match result) is centred at a bit match ratio of around 97%, whereas the peak for the second best match, where a comparison is performed against scans of different articles is now centred at a bit match ratio of around 55%. Thus the distinction between a non-match and a match is much clearer and more distinct.

As will be clear to the skilled reader, each of the two processes implemented in the present example separately provides a significant contribution to avoiding match results reaching a wrong conclusion due to printing or patterning on an article surface. Implementation of either one (or both) of these techniques can therefore enable a single authentication or verification system to work on a variety of article types without any need to know which article type is being considered or any need to pre-configure a record signature database before population.

In alternative examples, the approach to conduct of step V5 as described in EP1,730,675A can be used instead of the example above.

Verification Step V6 issues a result of the verification process. In experiments carried out upon paper, it has generally been found that 75% of bits in agreement represents a good or excellent match, whereas 50% of bits in agreement represents no match.

The determination of whether a given result represents a match or a non-match is performed against a threshold or set of thresholds. The level of distinction required between a match and a non-match can be set according to a level of sensitivity to false positives and false negatives in a particular application. The threshold may relate to an absolute BMR value and/or may include a measure of the peak width for a group of non-match results from shortlisted record signatures and/or may include a measure of the separation in BMR between the best result and the second best result.

By way of example, it has been experimentally found that a database comprising 1 million records, with each record containing a 128-bit thumbnail of the Fourier transform amplitude spectrum, can be searched in 1.7 seconds on a standard PC computer of 2004 specification. 10 million entries can be searched in 17 seconds. More modern computers and high-end server computers can be expected to achieve speeds of 10 or more times faster than this.

Thus a method for verification of whether or not a signature generated from an article has been previously included in a database of known articles has been described.

It will be appreciated that many variations are possible. For example, instead of treating the cross-correlation coefficients as a pre-screen component, they could be treated together with the digitised intensity data as part of the main signature. For example the cross-correlation coefficients could be digitised and added to the digitised intensity data. The cross-correlation coefficients could also be digitised on their own and used to generate bit strings or the like which could then be searched in the same way as described above for the thumbnails of the digitised intensity data in order to find the hits.

Thus a number of options for comparing a test signature to record signatures to obtain a match confidence result have been described.

Figure 17:
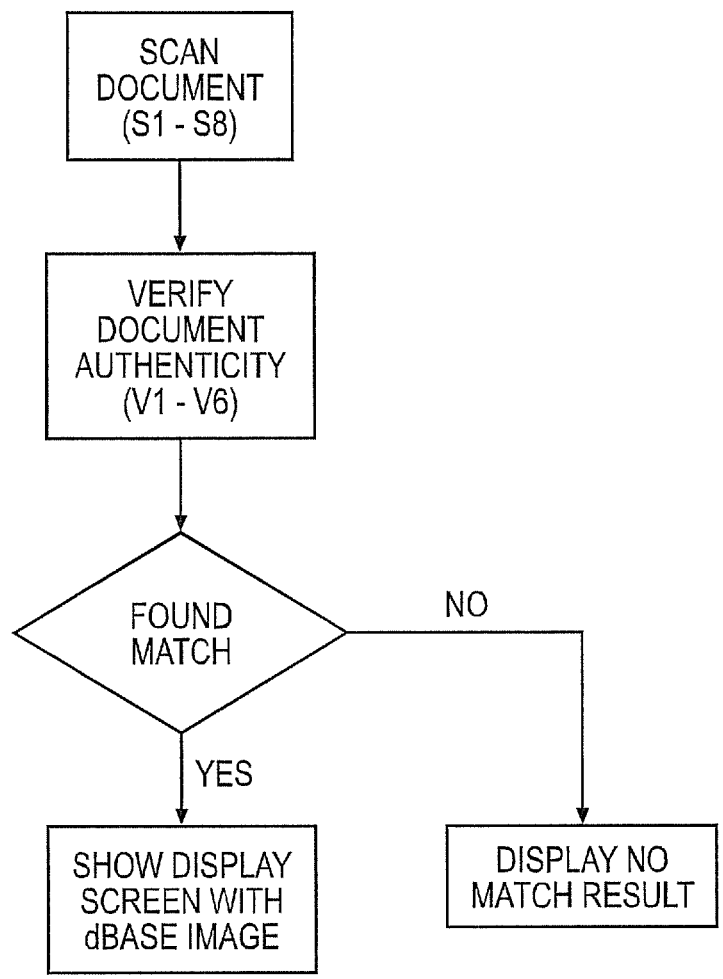
FIG. 17 is a flow diagram showing the overall process of how a document is scanned for verification purposes and the results presented to a user.

FIG. 17 is a flow diagram showing the overall process of how a document is scanned for verification purposes and the results presented to a user. First the document is scanned according to the scanning steps of FIG. 8. The document authenticity is then verified using the verification steps of FIG. 15. If there is no matching record in the database, a "no match" result can be displayed to a user. If there is a match, this can be displayed to the user using a suitable user interface. The user interface may be a simple yes/no indicator system such as a lamp or LED which turns on/off or from one colour to another for different results. The user interface may also take the form of a point of sale type verification report interface, such as might be used for conventional verification of a credit card. The user interface might be a detailed interface giving various details of the nature of the result, such as the degree of certainty in the result and data describing the original article or that article's owner. Such an interface might be used by a system administrator or implementer to provide feedback on the working of the system. Such an interface might be provided as part of a software package for use on a conventional computer terminal.

It will thus be appreciated that when a database match is found a user can be presented with relevant information in an intuitive and accessible form which can also allow the user to apply his or her own common sense for an additional, informal layer of verification. For example, if the article is a document, any image of the document displayed on the user interface should look like the document presented to the verifying person, and other factors will be of interest such as the confidence level and bibliographic data relating to document origin. The verifying person will be able to apply their experience to make a value judgement as to whether these various pieces of information are self consistent.

On the other hand, the output of a scan verification operation may be fed into some form of automatic control system rather than to a human operator. The automatic control system will then have the output result available for use in operations relating to the article from which the verified (or non-verified) signature was taken.

Thus there have now been described methods for scanning an article to create a signature therefrom and for comparing a resulting scan to an earlier record signature of an article to determine whether the scanned article is the same as the article from which the record signature was taken. These methods can provide a determination of whether the article matches one from which a record scan has already been made to a very high degree of accuracy.

From one point of view, there has thus now been described, in summary, a system in which a digital signature is obtained by digitising a set of data points obtained by scanning a coherent beam over a paper, cardboard, plastic, metal or other article, and measuring the scatter. A thumbnail digital signature is also determined, either in realspace by averaging or compressing the data, or by digitising an amplitude spectrum of a Fourier transform of the set of data points. A database of digital signatures and their thumbnails can thus be built up. The authenticity of an article can later be verified by re-scanning the article to determine its digital signature and thumbnail, and then searching the database for a match. Searching is done on the basis of the thumbnail to improve search speed. Use of a Fourier transform based thumbnail can improve speed, since, in a pseudo-random bit sequence, any bit shift only affects the phase spectrum, and not the amplitude spectrum, of a Fourier transform represented in polar co-ordinates. The amplitude spectrum stored in the thumbnail can therefore be matched without any knowledge of the unknown bit shift caused by registry errors between the original scan and the re-scan.

In some examples, the method for extracting a signature from a scanned article can be optimised to provide reliable recognition of an article despite deformations to that article caused by, for example, stretching or shrinkage. Such stretching or shrinkage of an article may be caused by, for example, water damage to a paper or cardboard based article.

Also, an article may appear to a scanner to be stretched or shrunk if the relative speed of the article to the sensors in the scanner is non-linear. This may occur if, for example the article is being moved along a conveyor system, or if the article is being moved through a scanner by a human holding the article. An example of a likely scenario for this to occur is where a human scans, for example, a bank card using a swipe-type scanner.

In some examples, where a scanner is based upon a scan head which moves within the scanner unit relative to an article held stationary against or in the scanner, then linearisation guidance can be provided within the scanner to address any non-linearities in the motion of the scan head. Where the article is moved by a human, these non-linearities can be greatly exaggerated To address recognition problems which could be caused by these non-linear effects, it is possible to adjust the analysis phase of a scan of an article. Thus a modified validation procedure will now be described with reference to FIG. 18a. The process implemented in this example uses a block-wise analysis of the data to address the non-linearities.

The process carried out in accordance with FIG. 14a can include some or all of the steps of time domain filtering, alternative or additional linearisation, space domain filtering, smoothing and differentiating the data, and digitisation for obtaining the signature and thumbnail described with reference to FIG. 15, but are not shown in FIG. 18a so as not to obscure the content of that figure.

Figure 18A:
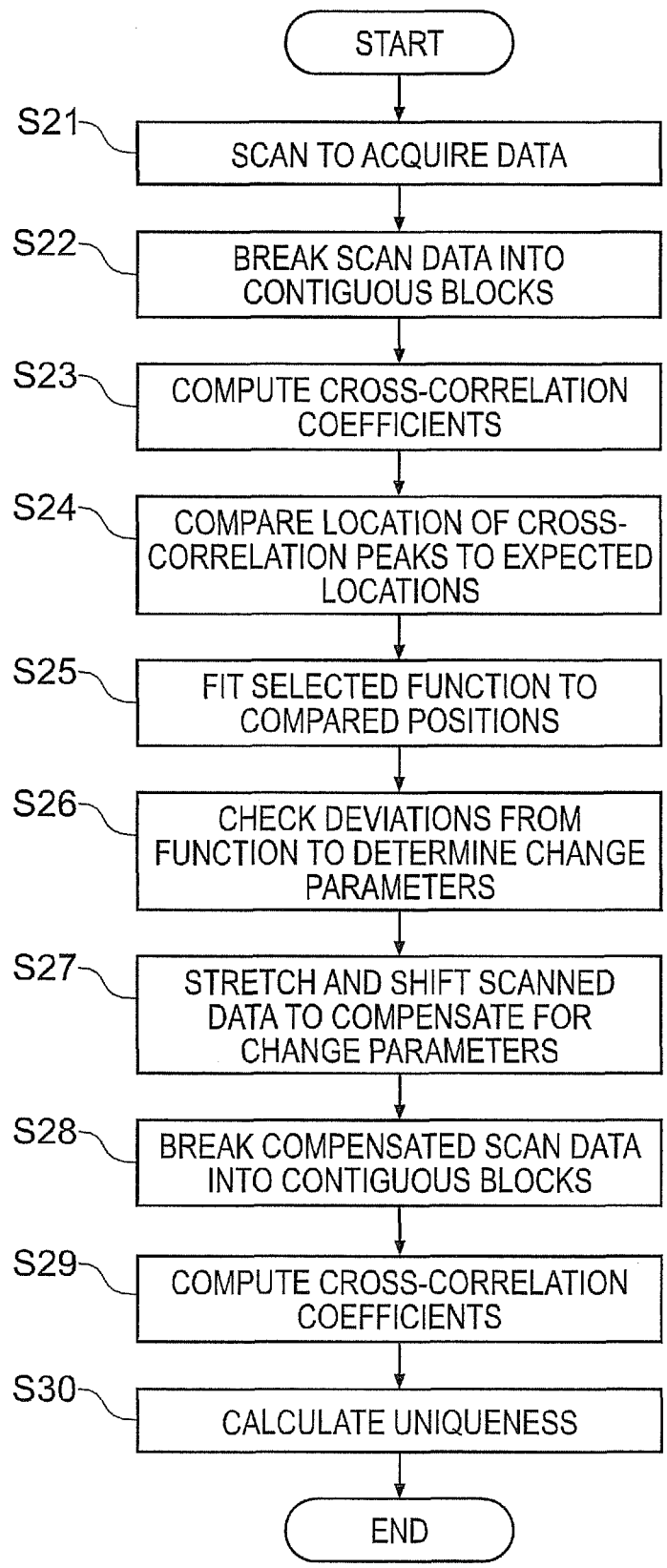
FIG. 18a is a flow diagram showing how the verification process of FIG. 15 can be altered to account for non-idealities in a scan.

As shown in FIG. 18a, the scanning process for a validation scan using a block-wise analysis starts at step S21 by performing a scan of the article to acquire the date describing the intrinsic properties of the article. This scanned data is then divided into contiguous blocks (which can be performed before or after digitisation and any smoothing/differentiation or the like) at step S22. In one example, a scan area of 1600 mm$^2$ (e.g. 40 mm×40 mm) is divided into eight equal length blocks. Each block therefore represents a subsection of the scanned area of the scanned article.

For each of the blocks, a cross-correlation is performed against the equivalent block for each stored signature with which it is intended that article be compared at step S23. This can be performed using a thumbnail approach with one thumbnail for each block. The results of these cross-correlation calculations are then analysed to identify the location of the cross-correlation peak. The location of the cross-correlation peak is then compared at step S24 to the expected location of the peak for the case where a perfectly linear relationship exists between the original and later scans of the article.

As this block-matching technique is a relatively computationally intensive process, in some examples its use may be restricted to use in combination with a thumbnail search such that the block-wise analysis is only applied to a shortlist of potential signature matches identified by the thumbnail search.

Figure 19A:
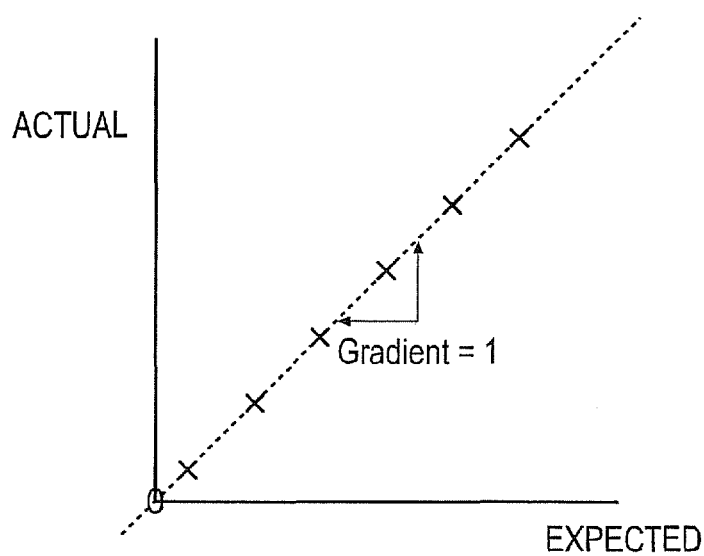
FIG. 19A shows an example of cross-correlation data gathered from a scan.
Figure 19B:
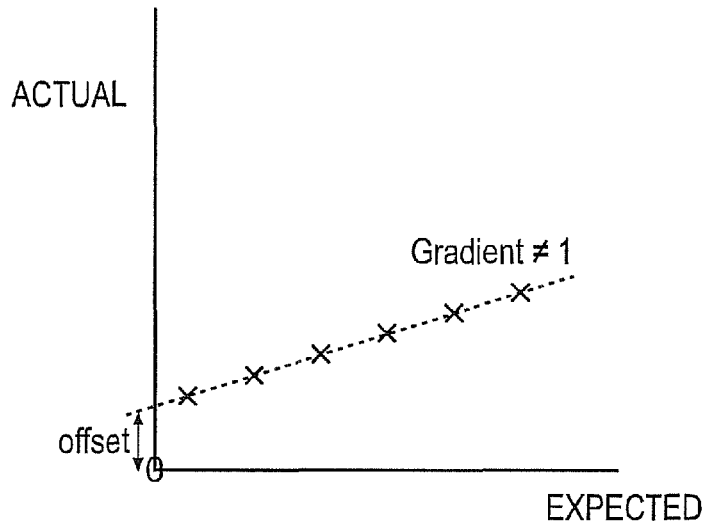
FIG. 19B shows an example of cross-correlation data gathered from a scan where the scanned article is distorted.
Figure 19C:
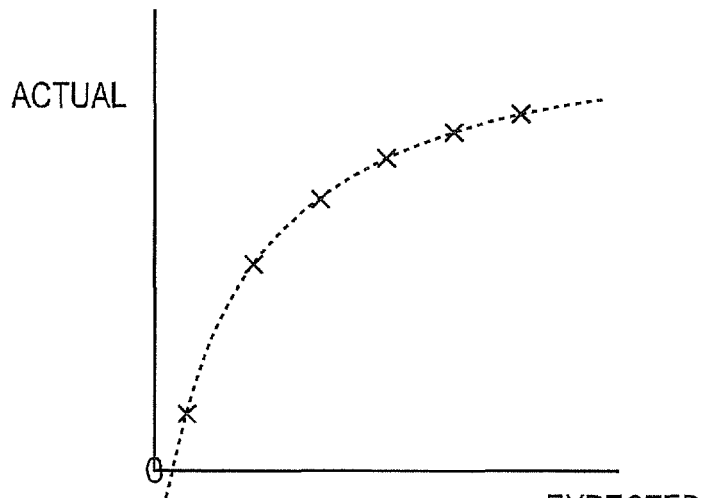
FIG. 19C shows an example of cross-correlation data gathered from a scan where the scanned article is scanned at non-linear speed.

This relationship can be represented graphically as shown in FIGS. 19A, 19B and 19C. In the example of FIG. 19A, the cross-correlation peaks are exactly where expected, such that the motion of the scan head relative to the article has been perfectly linear and the article has not experienced stretch or shrinkage. Thus a plot of actual peak positions against expected peak results in a straight line which passes through the origin and has a gradient of 1.

In the example of FIG. 19B, the cross-correlation peaks are closer together than expected, such that the gradient of a line of best fit is less than 1. Thus the article has shrunk relative to its physical characteristics upon initial scanning. Also, the best fit line does not pass through the origin of the plot. Thus the article is shifted relative to the scan head compared to its position for the record scan.

In the example of FIG. 19C, the cross correlation peaks do not form a straight line. In this example, they approximately fit to a curve representing a $y^2$ function. Thus the movement of the article relative to the scan head has slowed during the scan. Also, as the best fit curve does not cross the origin, it is clear that the article is shifted relative to its position for the record scan.

A variety of functions can be test-fitted to the plot of points of the cross-correlation peaks to find a best-fitting function. Thus curves to account for stretch, shrinkage, misalignment, acceleration, deceleration, and combinations thereof can be used. Examples of suitable functions can include straight line functions, exponential functions, a trigonometric functions, $x^2$ functions and $x^3$ functions.

Once a best-fitting function has been identified at step S25, a set of change parameters can be determined which represent how much each cross-correlation peak is shifted from its expected position at step S26. These compensation parameters can then, at step S27, be applied to the data from the scan taken at step S21 in order substantially to reverse the effects of the shrinkage, stretch, misalignment, acceleration or deceleration on the data from the scan. As will be appreciated, the better the best-fit function obtained at step S25 fits the scan data, the better the compensation effect will be.

The compensated scan data is then broken into contiguous blocks at step S28 as in step S22. The blocks are then individually cross-correlated with the respective blocks of data from the stored signature at step S29 to obtain the cross-correlation coefficients. This time the magnitude of the cross-correlation peaks are analysed to determine the uniqueness factor at step S29. Thus it can be determined whether the scanned article is the same as the article which was scanned when the stored signature was created.

Accordingly, there has now been described an example of a method for compensating for physical deformations in a scanned article, and/or for non-linearities in the motion of the article relative to the scanner. Using this method, a scanned article can be checked against a stored signature for that article obtained from an earlier scan of the article to determine with a high level of certainty whether or not the same article is present at the later scan. Thereby an article constructed from easily distorted material can be reliably recognised. Also, a scanner where the motion of the scanner relative to the article may be non-linear can be used, thereby allowing the use of a low-cost scanner without motion control elements.

Figure 18B:
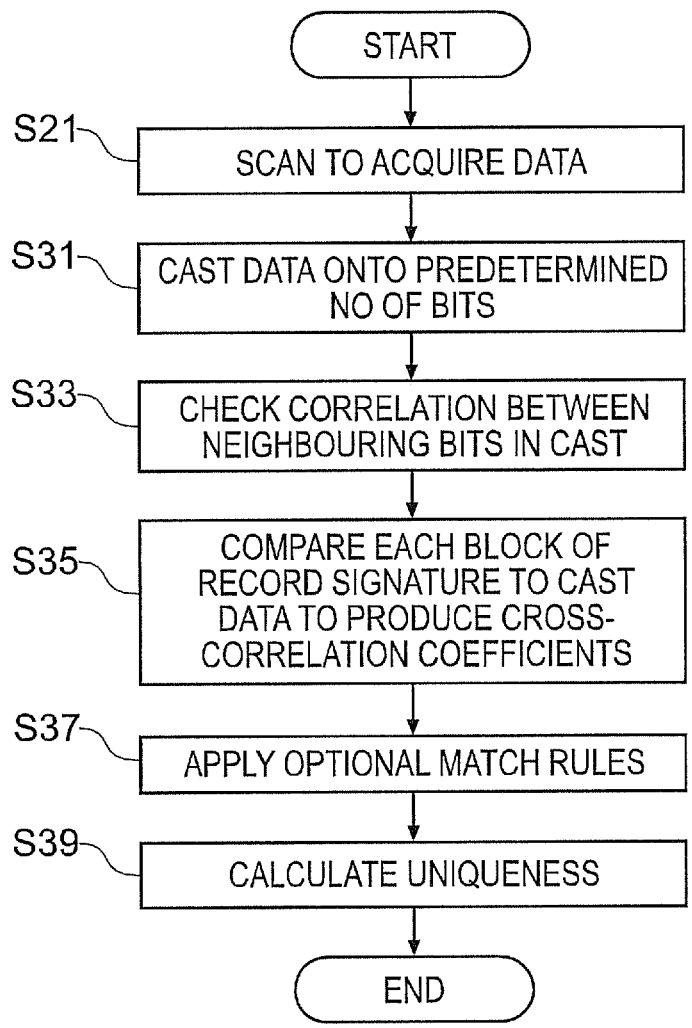
FIG. 18b is a flow diagram showing another example of how the verification process of FIG. 15 can be altered to account for non-idealities in a scan.

An alternative method for performing a block-wise analysis of scan data is presented in FIG. 18b This method starts at step S21 with performing a scan of the target surface as discussed above with reference to step S21 of FIG. 18a. Once the data has been captured, this scan data is cast onto a predetermined number of bits at step S31. This consists of an effective reduction in the number of bits of scan data to match the cast length. In the present example, the scan data is applied to the cast length by taking evenly spaced bits of the scan data in order to make up the cast data.

Next, step S33, a check is performed to ensure that there is a sufficiently high level of correlation between adjacent bits of the cast data. In practice, it has been found that correlation of around 50% between neighbouring bits is sufficient. If the bits are found not to meet the threshold, then the filter which casts the scan data is adjusted to give a different combination of bits in the cast data.

Once it has been determined that the correlation between neighbouring bits of the cast data is sufficiently high, the cast data is compared to the stored record signature at step S35. This is done by taking each predetermined block of the record signature and comparing it to the cast data. In the present example, the comparison is made between the cast data and an equivalent reduced data set for the record signature. Each block of the record signature is tested against every bit position offset of the cast data, and the position of best match for that block is the bit offset position which returns the highest cross-correlation value.

Once every block of the record signature has been compared to the cast data, a match result (bit match ratio) can be produced for that record signature as the sum of the highest cross-correlation values for each of the blocks. Further candidate record signatures can be compared to the cast data if necessary (depending in some examples upon whether the test is a 1:1 test or a 1:many test).

After the comparison step is completed, optional matching rules can be applied at step S37. These may include forcing the various blocks of the record signature to be in the correct order when producing the bit match ration for a given record signature. For example if the record signature is divided into five blocks (block 1, block 2, block 3, block 4 and block 5), but the best cross-correlation values for the blocks, when tested against the cast data returned a different order of blocks (e.g. block 2, block 3, block 4, block 1, block 5) this result could be rejected and a new total calculated using the best cross-correlation results that keep the blocks in the correct order. This step is optional as, in experimental tests carried out, it has been seen that this type of rule makes little if any difference to the end results. This is believed to be due to the surface identification property operating over the length of the shorter blocks such that, statistically, the possibility of a wrong-order match occurring to create a false positive is extremely low.

Finally, at step S39, using the bit match ratio, the uniqueness can be determined by comparing the whole of the scan data to the whole of the record signature, including shifting the blocks of the record signature against the scan data based on the position of the cross-correlation peaks determined in step S35. This time the magnitude of the cross-correlation peaks are analysed to determine the uniqueness factor at step S39. Thus it can be determined whether the scanned article is the same as the article which was scanned when the stored record signature was created The block size used in this method can be determined in advance to provide for efficient matching and high reliability in the matching. When performing a cross-correlation between a scan data set and a record signature, there is an expectation that a match result will have a bit match ratio of around 0.9. A 1.0 match ratio is not expected due to the biometric-type nature of the property of the surface which is measured by the scan. It is also expected that a non-match will have a bit match ratio of around 0.5. The nature of the blocks as containing fewer bits than the complete signature tends to shift the likely value of the non-match result, leading to an increased chance of finding a false-positive. For example, it has been found by experiment that a block length of 32 bits moves the non-match to approximately 0.75, which is too high and too close to the positive match result at about 0.9 for many applications. Using a block length of 64 bits moves the non-match result down to approximately 0.68, which again may be too high in some applications. Further increasing the block size to 96 bits, shifts the non-match result down to approximately 0.6, which, for most applications, provides more than sufficient separation between the true positive and false positive outcomes. As is clear from the above, increasing the block length increases the separation between non-match and match results as the separation between the match and non-match peaks is a function of the block length. Thus it is clear that the block length can be increased for greater peak separation (and greater discrimination accuracy) at the expense of increased processing complexity caused by the greater number of bits per block. On the other hand, the block length may be made shorter, for lower processing complexity, if less separation between true positive and false positive outcomes is acceptable.

It is also possible to produce a uniqueness measure for individual subsets of the data gathered by the photodetectors and to combine those individual uniqueness values rather than combining the data and then calculating an overall uniqueness. For example, in some examples, the data is broken down into a set of blocks for processing and each block can have a BMR calculated therefor. This can be taken a step further such that a uniqueness measure is created for each block. Likewise, the data from individual photodetectors can be analysed to create a uniqueness therefor.

By taking such a approach, additional information about the overall uniqueness may become apparent. For example if the data is split into 10 blocks and three of those blocks provide a very strong uniqueness and the other seven blocks return a weaker or non-existent uniqueness, then this might provide the same overall uniqueness as if the ten blocks all have a modest uniqueness. Thus tampering of articles, article damage, sensor malfunction and a number of other conditions can be detected.

Such an approach thus involves combining the individual block and/or photodetector uniquenesses to give the overall uniqueness. This is can be a straightforward combination of the values, or in some circumstances a weighting may be applied to emphasise the contribution of some values over others. To combine uniquenesses expressed in a logarithmic scale, the individual uniquenesses are summed (e.g. of three blocks each have a uniqueness of $10^{20}$, the overall uniqueness would be $10^{60}$), and the values are multiplied if a logarithmic scale is not used.

Another characteristic of an article which can be detected using a block-wise analysis of a signature generated based upon an intrinsic property of that article is that of localised damage to the article. For example, such a technique can be used to detect modifications to an article made after an initial record scan.

For example, many documents, such as passports, ID cards and driving licenses, include photographs of the bearer. If an authenticity scan of such an article includes a portion of the photograph, then any alteration made to that photograph will be detected. Taking an arbitrary example of splitting a signature into 10 blocks, three of those blocks may cover a photograph on a document and the other seven cover another part of the document, such as a background material. If the photograph is replaced, then a subsequent rescan of the document can be expected to provide a good match for the seven blocks where no modification has occurred, but the replaced photograph will provide a very poor match. By knowing that those three blocks correspond to the photograph, the fact that all three provide a very poor match can be used to automatically fail the validation of the document, regardless of the average score over the whole signature.

Also, many documents include written indications of one or more persons, for example the name of a person identified by a passport, driving license or identity card, or the name of a bank account holder. Many documents also include a place where written signature of a bearer or certifier is applied. Using a block-wise analysis of a signature obtained therefrom for validation can detect a modification to alter a name or other important word or number printed or written onto a document. A block which corresponds to the position of an altered printing or writing can be expected to produce a much lower quality match than blocks where no modification has taken place. Thus a modified name or written signature can be detected and the document failed in a validation test even if the overall match of the document is sufficiently high to obtain a pass result.

The area and elements selected for the scan area can depend upon a number of factors, including the element of the document which it is most likely that a fraudster would attempt to alter. For example, for any document including a photograph the most likely alteration target will usually be the photograph as this visually identifies the bearer. Thus a scan area for such a document might beneficially be selected to include a portion of the photograph. Another element which may be subjected to fraudulent modification is the bearer's signature, as it is easy for a person to pretend to have a name other than their own, but harder to copy another person's signature. Therefore for signed documents, particularly those not including a photograph, a scan area may beneficially include a portion of a signature on the document.

In the general case therefore, it can be seen that a test for authenticity of an article can comprise a test for a sufficiently high quality match between a verification signature and a record signature for the whole of the signature, and a sufficiently high match over at least selected blocks of the signatures. Thus regions important to the assessing the authenticity of an article can be selected as being critical to achieving a positive authenticity result.

In some examples, blocks other than those selected as critical blocks may be allowed to present a poor match result. Thus a document may be accepted as authentic despite being torn or otherwise damaged in parts, so long as the critical blocks provide a good match and the signature as a whole provides a good match.

Thus there have now been described a number of examples of a system, method and apparatus for identifying localised damage to an article, and for rejecting an inauthentic an article with localised damage or alteration in predetermined regions thereof. Damage or alteration in other regions may be ignored, thereby allowing the document to be recognised as authentic.

In some scanner apparatuses, it is also possible that it may be difficult to determine where a scanned region starts and finishes. Of the examples discussed above, this may be most problematic a processing line type system where the scanner may "see" more than the scan area for the article. One approach to addressing this difficulty would be to define the scan area as starting at the edge of the article. As the data received at the scan head will undergo a clear step change when an article is passed though what was previously free space, the data retrieved at the scan head can be used to determine where the scan starts.

In this example, the scan head is operational prior to the application of the article to the scanner. Thus initially the scan head receives data corresponding to the unoccupied space in front of the scan head. As the article is passed in front of the scan head, the data received by the scan head immediately changes to be data describing the article. Thus the data can be monitored to determine where the article starts and all data prior to that can be discarded. The position and length of the scan area relative to the article leading edge can be determined in a number of ways. The simplest is to make the scan area the entire length of the article, such that the end can be detected by the scan head again picking up data corresponding to free space. Another method is to start and/or stop the recorded data a predetermined number of scan readings from the leading edge. Assuming that the article always moves past the scan head at approximately the same speed, this would result in a consistent scan area. Another alternative is to use actual marks on the article to start and stop the scan region, although this may require more work, in terms of data processing, to determine which captured data corresponds to the scan area and which data can be discarded.

In some examples, a drive motor of the processing line may be fitted with a rotary encoder to provide the speed of the article. This can be used to determine a start and stop position of the scan relative to a detected leading edge of the article. This can also be used to provide speed information for linearization of the data, as discussed above with reference to FIG. 8. The speed can be determined from the encoder periodically, such that the speed is checked once per day, once per hour, once per half hour etc.

In some examples the speed of the processing line can be determined from analysing the data output from the sensors. By knowing in advance the size of the article and by measuring the time which that article takes to pass the scanner, the average speed can be determined. This calculated speed can be used to both locate a scan area relative to the leading edge and to linearise the data, as discussed above with reference to FIG. 8.

Another method for addressing this type of situation is to use a marker or texture feature on the article to indicate the start and/or end of the scan area. This could be identified, for example using the pattern matching technique described above.

Thus there has now been described an number of techniques for scanning an item to gather data based on an intrinsic property of the article, compensating if necessary for damage to the article or non-linearities in the scanning process, and comparing the article to a stored signature based upon a previous scan of an article to determine whether the same article is present for both scans.

A further optional arrangement for the signature generation will now be described. The technique of this example uses a differential approach to extraction of the reflected signals from the photodetectors 16 (as illustrated in FIG. 1). In this approach, the photodetectors are handled in pairs. Thus if more than two photodetectors are used, some may be included in pairs for a differential approach and some may be considered individually or in a summing sense. The remainder of this example will refer to a situation where two photodetectors 16*a* and 16*b* are employed.

In the present example, the output from each photodetector 16 is fed to a separate ADC 31. The outputs of these two ADCs are then differenced (for example whereby the digitised signal from the second photodetector is subtracted from the digitised signal from the first photodetector) to provide the data set that is used for signature generation.

This technique is particularly applicable to situations where the outputs from the two photodetectors are substantially anticorrelated as the differencing then has the effect of up to doubling the signal strength. Examples of situations where a high level of anticorrelation occurs are surfaces with high levels of halftone printing.

Thus an example of a system for obtaining and using a biometric-type signature from an article has been described. Alternative scanner arrangements, and various applications and uses for such a system are set out in the various patent applications identified above. The use of the match result testing approaches disclosed herein with any of the physical scanner arrangements and/or the applications and uses of such technology disclosed in those other patent applications is contemplated by the inventor.

A system as described above can be considered to be controlled and influenced by a number of variables, and a number of variables can be used as measures of the performance of the system. In order to maximise the performance of a given implementation of a system which uses a signature derived from the intrinsic structure of an article in the manner described above, a number of parameters can be adjusted and the outputs measured to determine the performance of the system overall.

The inventors have attempted a number of methods to optimise such a system implementation and have determined a method for achieving such optimisation as will now be described.

In the context of the present example, the implementation or system to be optimised includes the whole chain of elements necessary to provide the authenticity validation or verification through use of the biometric type signatures. For example, this may include a record scanner where articles are scanned (possibly as part of a production process) in order to populate a database of known articles, the database or articles and a field scanner where articles are scanned to determine their validity/authenticity. In some examples, a sub-set of the whole system may be optimised in a first operation and that sub-set may then be optimised to the reminder, for example a set of field scanners may be optimised together and the data for these fixed for optimisation against the record scanner. The parameters governing the record scanner and the field scanner are not necessarily the same as the two may operate in a different environment under different conditions. Thus each of the parameters discussed below may appear twice or more in the set of parameters, once for each of the record and field scanners. Of course more than one form of line scanner or more than one form of field scanner may be included in the system, which may lead to more system components and correspondingly more system parameters.

An authentication system such as that described above typically has somewhere of the order of 10-20 parameters, different groups of which may be wholly independent, partially interdependent or totally interdependent. Each of these parameters may have, either independently or in combination with some or all of the other parameters, localised maxima and minima in terms of a total cost space in which the performance of the overall system can be evaluated. It is a problem when attempting to optimise the system as a whole that such localised maxima and minima can be hard to identify as such and so the overall maximum or minimum for the whole system can become unattainable if such a localised maximum or minimum is identified as the maximum or minimum for that parameter (or parameter group).

Accordingly, it is proposed to manage the parameters of interest though an evolutionary type process to achieve an optimised performance for the particular system implementation.

Parameters which may need to be considered and adjusted to achieve an optimised result can include the following.

Filter order of the time domain filter (see step S2 described above). This (optional) filter operates to remove low frequency components such as can be expected from electrical noise and background lighting (e.g. 50/60 Hz and 100/120 Hz bands) as well as particular behavioural characteristics of the particular optical detectors used in the implementation. The filter can also operate to remove high frequency components which typically constitute white noise components.

Rise and fall time of the time domain filter.

Filter order of the space domain band pass filter (see step S4 described above). This (optional) filter operates to pass a range of wavelengths in the x-direction (the direction of movement of the scan head). The filter aids in maximising difference between samples and maintaining a high number of degrees of freedom within the data.

Rise and fall space of the band pass filter.

The spatial resolution, which needs to be controlled to avoid under-sampling (Nyquist) of the received signals. Also excessive over-sampling may be undesirable as it can create extra data processing and storage requirements for no increase in actual information content. This should normally be consistent across all scans which may be compared so as to ensure that comparisons are based upon compatible data.

A smoothing function, typically a Gaussian smoothing function.

Encoder settings. This optional parameter relates to the optional spatial encoder. This setting relates to the conversion between the time signal from the encoder and the spatial information which it represents. It may be categorised as the number of cycles per unit distance or distance per cycle.

The number of blocks/the block size used for the data analysis in the comparison. This optional parameter relates to the blocks used for analysis of data linearity as discussed with reference to FIG. 19 above. The same or another block number/size parameter may also relate to the blocks used in the event that the matching itself is done on a block-by-block basis.

The fitting order of the polynomial function used to describe the block relationships and offset in the analysis of the data linearity as discussed with reference to FIG. 19 above.

The stretch range which defines the maximum movement of blocks when compensating following the analysis of the data linearity as discussed with reference to FIG. 19 above.

The standard deviation threshold that determines the number of points to be included in the comparison. In theory all points would be included, but in practice those close to the mean are often removed as they are likely to be incorrectly matched and thus may be unreliable matching points. The decision on which points to include/exclude can be controlled by using a standard deviation threshold. If the standard deviation threshold is too low, then more points close to the mean (which are more likely to be incorrectly matched) are included in the comparison. If the standard deviation threshold is too high, then less points are included in the comparison such that the statistical certainty (confidence) in a match result is reduced.

An initial offset range to optionally define the float position of the test signature against the record signature before a match is attempted.

Text effect removal filter parameters. Such an optional filter may be used to reduce or remove the effect of text in the scan area on the resultant signature. Such a filter may be a top-hat type filter. The parameters for the filter may include an on/off status, a width and a location.

An image threshold, to optionally enable image (including text and printing) patterns to be identified in the captured data and excluded from calculation of the standard deviation and the match process.

Where parameter values are not ordinarily expressed in a format directly accessible to the optimisation approach, they can be converted into a suitable format. Where the optimisation approach requires parameter values as binary sequences, the parameters can be converted between the "native" format and the binary sequence by defining the resolution required for each parameter (i.e. the number of discrete possible values required for the parameter) and then allocating a necessary number of bits to the parameter value. Conversion from the "native" value to the binary value is then a matter of digitising the "native value" into the value resolution space as defined. Reverse conversion is the reverse process.

In order to evaluate the parameters and their effect on the overall performance, it is necessary to define the result which is desired. This result can be referred to as a "target cost" if one thinks in terms of evaluating within a "cost space" and can also be referred to as a "fitness function". A suitable methods for defining the performance of an authentication system as described above is the confidence that a match result is not a false positive and the confidence that a non-match result is not a false negative. Depending upon the application, either or both of these two could be of prime importance.

Figure 20:
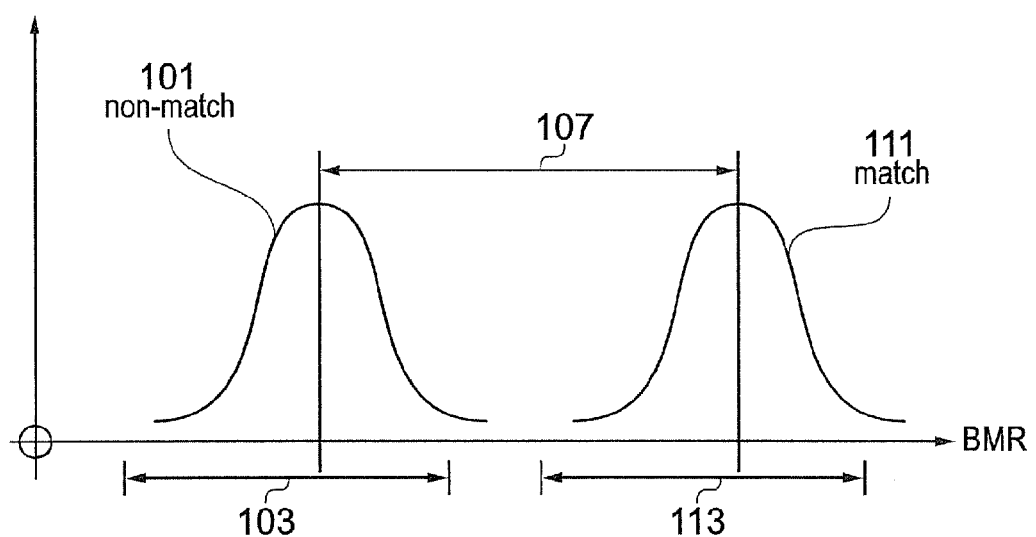
FIG. 20 shows a plot of results obtained when signatures derived from the intrinsic properties of a set of articles above are compared.

To assist in understanding the nature of the results, reference is made to FIG. 20, which shows a plot of the results obtained when signatures derived from the intrinsic properties of a set of articles in the manner described above are compared. The x-axis represents the bit match rate, or number/percentage of bits of the test signature that match with a corresponding bit in a given record signature. The y-axis represents the incidence of the particular bit match rate value, such that one interpretation of the plot is that it is representative of the probability of a given bit match rate value occurring.

In the plot of FIG. 20, two separate data sets are plotted together. The data set that gives rise to the left hand peak (generally indicated 101) is a set of results where a test signature is compared to a record signature generated from a different article to the test signature—i.e. known non-match. The data set that gives rise to the right hand peak (generally indicated 111) is a set of results where a test signature is compared to a record signature generated from the same article as the test signature—i.e. known match.

In order to be certain that a given comparison result is correct, it is desirable to separate out these peaks as far as possible. It must however be recognised that as the signatures are fuzzy data, it is statistically almost impossible to achieve a perfect match between two signatures generated separately from the same article, such that a bit match rate of 100% is not expected. Also, due to the fact that two signatures generated from different articles are uncorrelated, such that a non-match result would expect to give a bit match rate of approximately 50% as to have a value approaching zero would in fact imply that a correlation was indeed present but that one signature were simply the inverse of the other.

An example of actual test data for non-match results resulted in a mean bit match rate for the data set as around 50%. For a match result, depending upon the material of the article and the operating parameters of the system, the mean bit match rate of the data set can be fall anywhere from around 70% to around 90%.

It is clear from the plot in FIG. 20 that important issues in establishing confidence that a match/non-match result is correct are the peak centres (mean) and width (proportional to standard deviation). Clearly, if the peaks are so close as to overlap, one would have to accept a large number of false negatives to ensure no false positives, or vice versa.

Therefore, the desired result when optimising a system can be expected to be one or more of maximising the peak separation (which in real terms means increasing the mean bit match rate for a match result and reducing it for a non-match result), generally indicated as distance 107 in FIG. 20, and minimising the peak widths (which in real terms means decreasing the standard deviation of both the match and non-match data sets), generally indicated as distance 103 for non-match peak 101 and as distance 113 for match peak 111.

Figure 21:
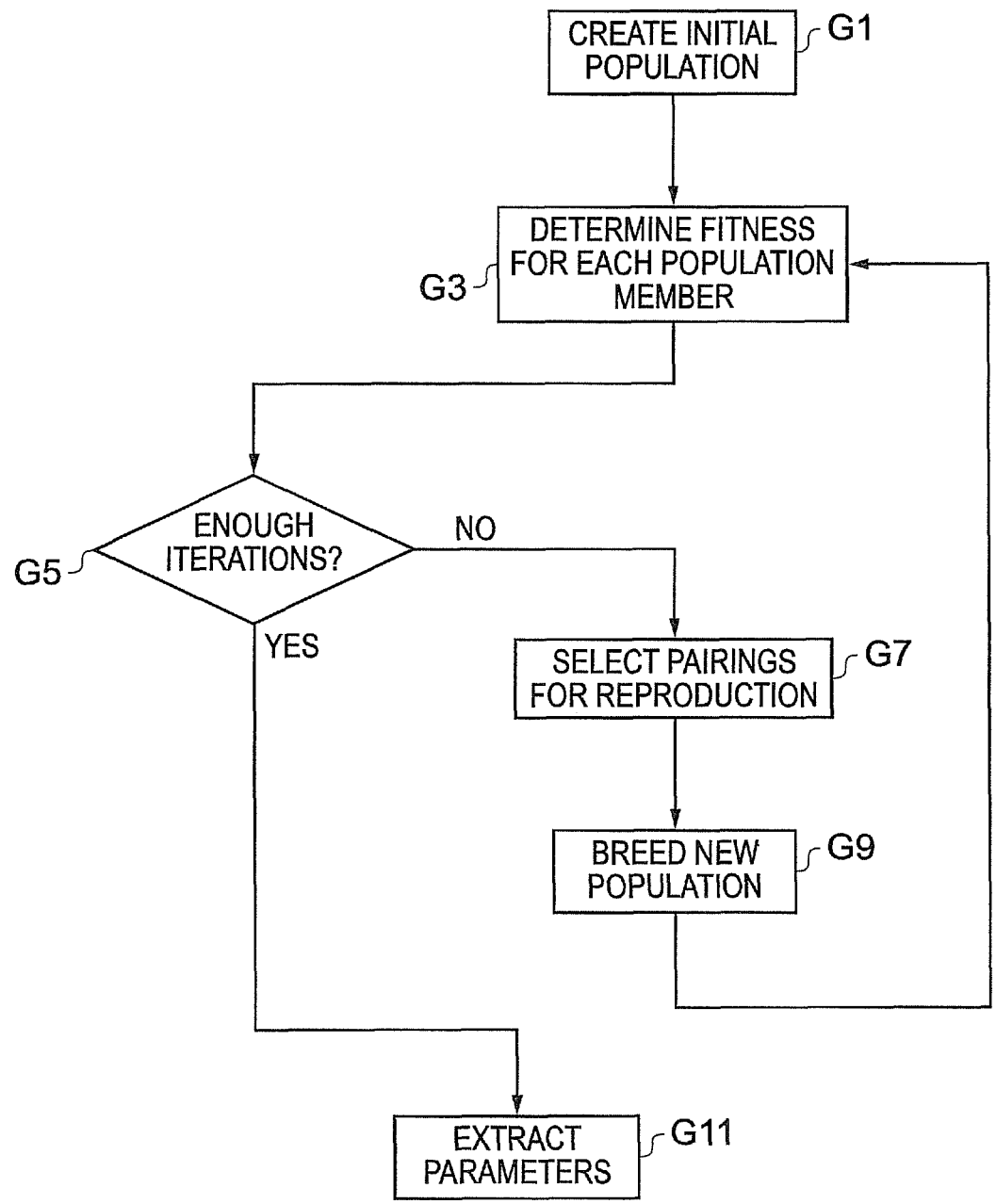
FIG. 21 is a flow diagram showing an example method for optimising a parameter set.

Once the set of parameters which is of relevance to a particular implementation has been defined, a method for manipulating the parameters to attempt to achieve the best result against the desired target is required. In the present invention, this is achieved according to an approach illustrated with respect to FIG. 21.

First, at step G1, an initial population of trial solutions is created. Each trial solution includes a value for each of the parameters being used in the optimisation. For a system where around 15 parameters are being considered, an initial population of around 1000 trial solutions provides a good balance between sufficient candidates to provide good genetic diversity and few enough candidates to process to reach a solution within an acceptable processing time. In the event of a larger amount of time being available to perform the process, a larger population could be used to further increase the genetic diversity of the population.

The trial population is then subjected to fitness testing at step G3. Each population member is analysed to provide a fitness result in terms of the desired target. Each population member necessarily lies within the cost space that includes all possible system configuration setting combinations encompassed by the parameters. The fitness for each population member is representative of how high or low the cost figure is for that particular population member. In the present examples, the fitness is defined as a value for a measure of how "good" the overall behaviour of the system is. A number of parameters could be selected, but in the present examples the measure is one which is representative of both the peak widths and the peak separation. This parameter is referred to as d' and is calculated as follows:

$$d' = \frac{SameMean - DifferentMean}{\sqrt{\frac{SameStd^2 - DifferentStd^2}{2}}}$$

Where SameMean is the mean of the peak for comparison of the same signature, DifferentMean is the mean of the peak for comparison of different signatures, SameStd is the standard deviation for the peak of the comparison of the same signature, and DifferentStd is the standard deviation for the peak of the comparison of different signatures.

Another option is to use a parameter referred to as b' which is also representative of both the peak widths and the peak separation but which uses the full peak width at the base rather than the standard deviation. b' is calculated as follows:

$$b' = \frac{SameMean - DifferentMean}{\sqrt{\frac{(SameMax - SameMin)^2 - (DifferentMax - DifferentMin)^2}{2}}}$$

Where SameMax is the value at the upper extent of the of the peak for comparison of the same signature, SameMin is the value at the lower extent of the of the peak for comparison of the same signature, DifferentMax is the value at the upper extent of the of the peak for comparison of different signatures, and DifferentMin is the value at the lower extent of the of the peak for comparison of different signatures.

It would also be possible to use a similar approach using, for example, the full width at half maximum in place of the standard deviation or base width.

Another possible approach is to use a parameter representative of the number of standard deviations of separation between the peaks, This parameter is referred to as c' and is calculated as follows:

$$c' = \frac{SameMean - DifferentMean}{DifferentStd}$$

A modification to use SameStd in place of DifferentStd would also be possible.

Another alternative parameter to optimise could be a parameter representative of the gap between the peaks, simply:

gap=SameMin−DifferentMax

At step G5, a check is performed to determine whether enough iterations have been completed. On the first iteration, it is very likely that enough iterations have not been completed. The total number of iterations of the process can be set in a number of ways. A fixed number of iterations may be set, or a convergence criterion may be applied to cease the process after a convergent result appears, or some other approach may be used. In the present example, the process continues for multiple iterations until either a trained operator believes that the result is good enough (which is an empirical measure of a convergent result) or until an available time period expires.

If more iterations are required (which often occurs as typically many iterations are performed), processing continues at step G7 where pairings of population members are selected for reproduction (mating). The selection of pairings is based upon the properties of the population members. In the present example, population members with a high fitness have an increased chance of mating, and population members are not monogamous but cannot mate with themselves. Not all population members need be included in the pairings. In the present examples, a mating distribution based upon the fitness measure is used for determining the mating probability for each current population member when generating the next distribution and a number of different possibilities for this exist. A linear transform may be used which indicates the if the fitness measure of a first population member is twice that of a second population member, the first member has twice the mating probability of the second member. Alternatively, an exponential distribution may be used increase the mating probability of weaker (lower fitness) members with the aim of reducing the risk of a rapid convergence to a local maximum. Other options include a windowing function (which tends to favour the stronger members), a direct cost equivalence method or a linear normalisation method.

Once the mating distribution is calculated, each population member joins in none, one or more pairs according to its allotted mating probability such that the outcome of the mating will be a new population with as many members as the previous population. Thus, each pair produces two offspring and the total number of pairs is half the population size.

The selected pairings are then used to breed a new population at step G9. Each created pair act as "parents". A cross-over point is assigned within the parameter string (or "gene sequence") for the pair of parents and two "children" are produced. In the present example, the cross-over point is selected randomly. The selected cross-over point can be the same for every pairing in the new population breeding, or can be re-selected for each pairing. The first child has the parameter string of the first parent up to the cross-over point and the parameter string of the second parent after the cross-over point. The second child has the parameter string of the second parent up to the cross-over point and the parameter string of the first parent after the cross-over point. The previous generation of the population is discarded after mating is completed.

In the present example, in order to avoid a danger of the results converging on a local minimum or maximum for the fitness, rather than the overall minimum or maximum, and to avoid too significant a reduction in the size of the gene pool, a mutation can be used during the mating sequence. One way to provide such a mutation is to determine according to a probability value whether each bit in the parameter string (when represented as a binary string) of each population member should remain the same or be altered. Thus, for each bit in the parameter strings the probability of that bit mutating can be set to a single level and a random number generator can be used to test against the probability. In the present example, the probability is set to be low but still significant. For example, the probability can be set such that on average one bit is value swapped in every 5 population members. Such a mutation system can be applied every iteration or only on selected iterations.

The mutation probability can be adjusted between iterations of the process. For example, if a number of sequential iterations lead to very little difference in the fitness of the population, the mutation rate can be increased in an effort to determine whether the convergence or stabilisation in the population is due to having found the overall maximum/minimum in the fitness criteria or whether a local minimum/maximum has been identified.

Once the new population (including any mutations) has been generated, the method returns to step G3 where the fitness of the new population members is determined.

Once a sufficient number of iterations have been completed, the result of step G5 becomes a yes (i.e. enough iterations is evaluated as a positive), and the method proceeds to step G11 where the parameters for the fittest population member are extracted for use in the system.

The expectation of using this process is that the overall fitness should increase from one generation of the population to the next (unless a high level of mutation has been inserted to deliberately alter the fitness profile as discussed above). The extracted parameters at the end of the process can be expected to be those of a population member which has the best fitness of a convergent population. In this sense, it may be considered to be a "first among equals" type result rather than a "clear winner" type result.

Figure 22:
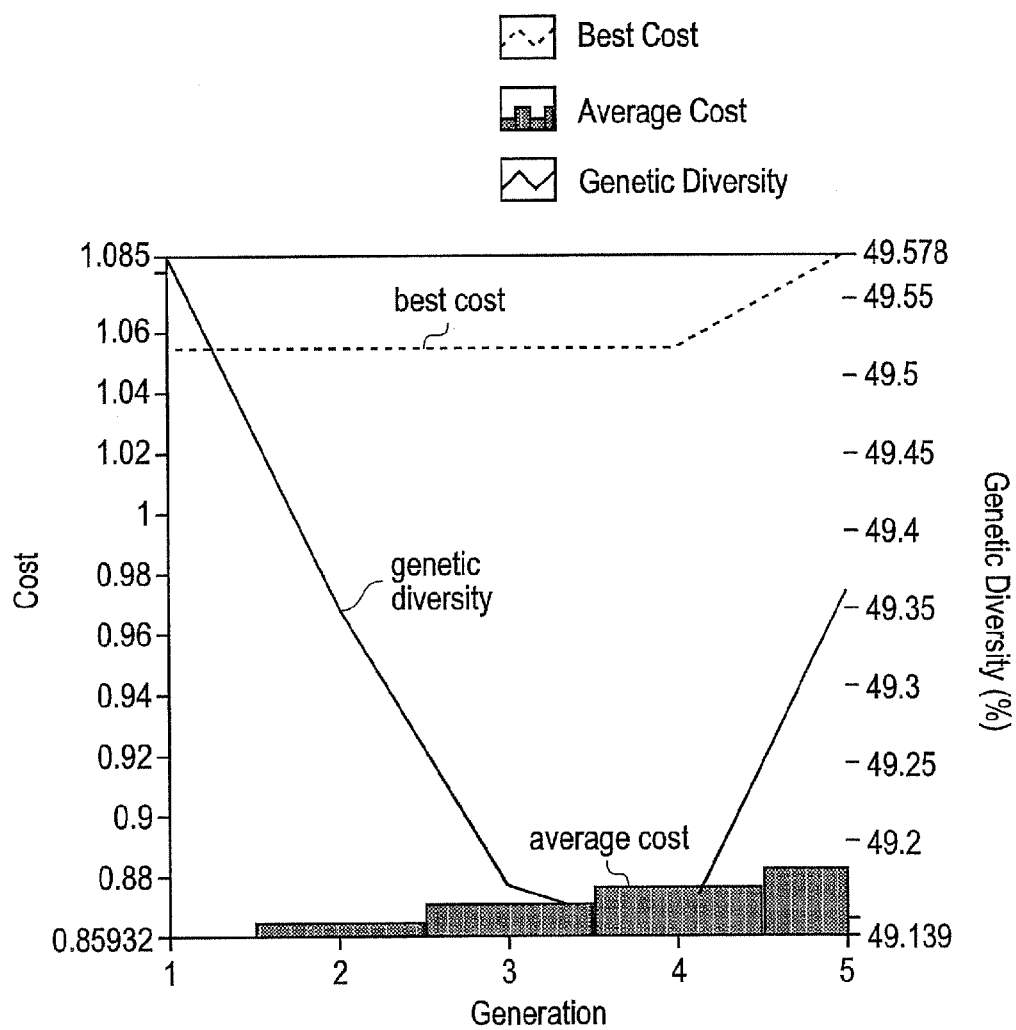
FIG. 22 shows a plot of illustrative sample data of average cost, the best cost and the genetic diversity of each generation of a population.

FIG. 22 shows a plot of illustrative sample data which shows for each of five generations in turn the average cost of the population (i.e. the mean fitness value across all population members), the best cost (i.e. the fitness value of the population member with the highest fitness) and the genetic diversity of each generation of the population. This illustrates that the average cost is increasing from one generation to the next (as would be expected), and that the best cost has increased toward the final generation and that the genetic diversity has remained high enough in all generations to provide for a realistic and useful result from the process. The increasing average and best cost figures indicate that an optimisation is occurring. The genetic diversity line indicates that there is enough genetic variation within the population for a useful optimisation result to occur. If the genetic diversity were to drop to be too low, there would be a significant risk of falling into a local maximum with no realistic chance for the population to escape that local maximum.

Figure 23:
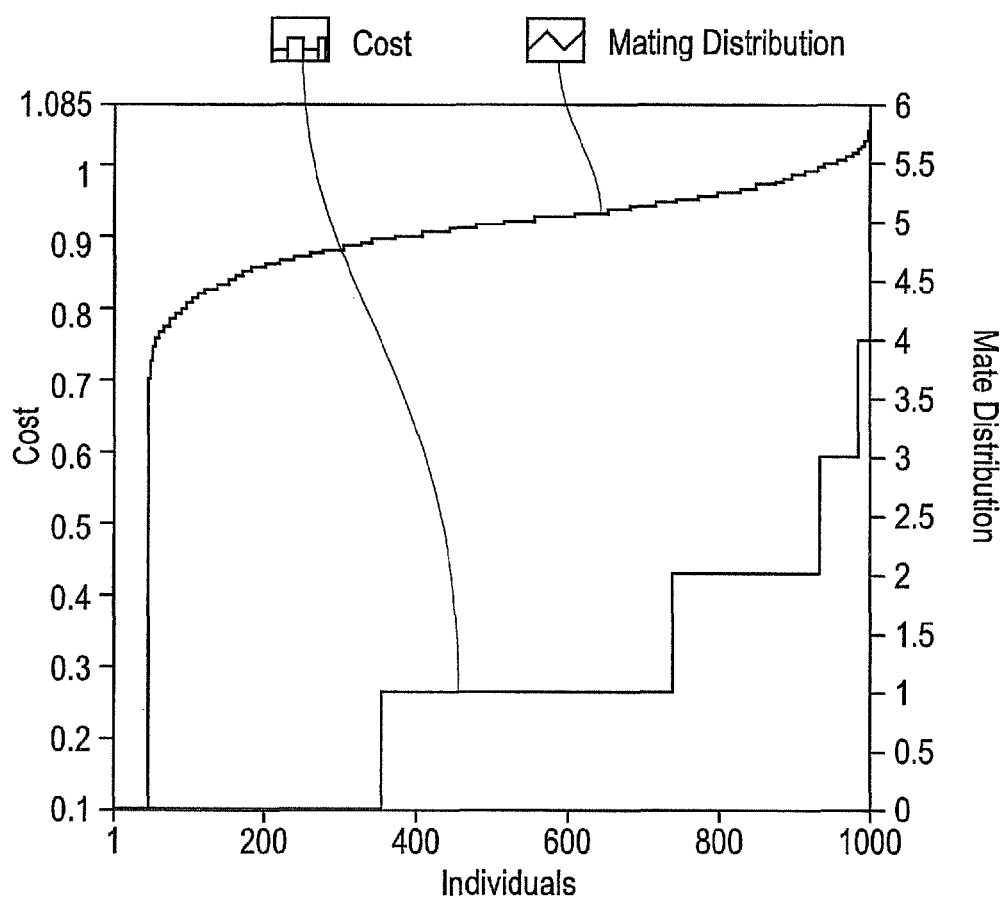
FIG. 23 shows a plot of illustrative sample data for a single generation of a population and the mating distribution applied thereto.

FIG. 23 shows a plot of illustrative sample data for a single generation of a population and the mating distribution applied thereto. The data is ordered by fitness such that the lowest fitness individuals are at the left side of the plot and the highest fitness individuals are at the right side of the plot. For each population member in the generation, the fitness is plotted, illustrating that in this generation there were around 350 members with a fitness of 0.1 or lower, with fitness values rising to the highest fitness member with a fitness of 1.085. Also shown in the plot is the mating distribution curve that the sets the mating probability for each population member. In this example, the mating distribution is weighted to maintain a large number of lower fitness members within the mating pattern in order to avoid rapid convergence to an early discovered maximum with associated the risk of that maximum being a local maximum.

Accordingly, using such a method for configuring system parameters for an authentication/validity system based upon use of a biometric type signature derived from inherent surface roughness of an article, an optimum set of parameter values to achieve a desired performance result can be achieved.

The desired performance result can be set to anything that a particular implementation is desired to possess. For example, in one implementation it may be critical to exclude any chance of a false positive but acceptable to have a small number of false negatives, or vice versa. In another example, in one implementation it may be acceptable to have a lower overall result confidence than in a different implementation. By selecting appropriate system parameter and configuring the parameter values to achieve the desired performance result, an efficient route to providing the desired performance result, without wasting effort or system resources on achieving an over-specified performance result, can be achieved. Such an approach can also reduce system implementation cost by enabling use of lower cost components to achieve a desired result by parameter optimisation rather than using more expensive components in a less optimised state.

The invention claimed is:

1. A method for implementing a system for authentication of an article based upon a signature generated from a set comprising groups of data points collected when a plurality of regions of an intrinsic surface structure of an article are sequentially subjected to coherent light and the light scattered by the intrinsic surface structure is collected, the method comprising, for a given system implementation:
   determining a set of parameters which influence the performance of the system;
   determining a definition of system performance which can be affected by the set of parameters;
   producing an initial population of parameter value sets, each parameter set including a value for each parameter to be used in achieving a desired system performance;
   determining for each parameter value set a fitness value in terms of the system performance definition;
   identifying mating pairs of the population in accordance with the determined fitnesses;
   producing a new population by crossing the mating pairs;
   repeating the determining of a fitness value for each parameter value set, the identifying of mating pairs and producing a new population until an end criterion is satisfied; and
   configuring the system in accordance with a selected one of the parameter sets from the final population;
   wherein the system comprises at least one record scanner operable to make a record signature for a known article, a database operable to store a record signature for a known article and a test scanner operable to make a signature for an article under test for comparison to one or more record signatures in the database.

2. The method of claim 1, wherein the end criterion includes one or more of a fixed number of iterations, a fixed number of iterations following a given result event; and a behaviour pattern in the overall population fitness values.

3. The method of claim 2, wherein the behaviour pattern is a convergent behaviour.

4. The method of claim 1, further including introducing a random mutation during or after the producing a new population.

5. The method of claim 4, wherein the mutation is inconsistent between iterations.

6. The method of claim 1, wherein each of the record scanner and the test scanner is operable to generate a signature for an article by:
sequentially illuminating a plurality of regions of the article with a coherent beam;
collecting a set comprising groups of data points from signals obtained when the coherent beam scatters from the different regions of the article, wherein different ones of the groups of data points relate to scatter from the respective different regions of the article; and
determining a signature of the article from the set of groups of data points.

7. The method of claim 1, wherein the definition of system performance includes at least one of a distribution width of a set of cross-comparisons between article signatures, and a distribution spacing between cross-comparison results for comparisons between like and non-like articles.

8. The method of claim 1, wherein the set of parameters includes at least one parameter selected from the group consisting of a time domain filter order, a time domain filter rise and fall space, a space domain filter order, a space domain rise and fall space, a spatial resolution, a smoothing function, an encoder setting, a block size, a number of blocks, a fitting polynomial order, a stretch range, a standard deviation threshold, an initial positioning offset, a text removal filter setting, an image threshold, and a scale amplitude.

9. The method of claim 1, wherein the set of parameters includes parameters that relate to post capture processing of the data points.

10. A system for authentication of an article based upon a signature generated from a set comprising groups of data points collected when a plurality of regions of an intrinsic surface structure of an article are sequentially subjected to coherent light and the light scattered by the intrinsic surface structure is collected, the system being configured in accordance with steps of:
determining a set of parameters which influence the performance of the system;
determining a definition of system performance which can be affected by the set of parameters;
producing an initial population of parameter value sets, each parameter set including a value for each parameter to be used in achieving a desired system performance;
determining for each parameter value set a fitness value in terms of the system performance definition;
identifying mating pairs of the population in accordance with the determined fitnesses;
producing a new population by crossing the mating pairs;
repeating the determining of a fitness value for each parameter value set, the identifying of mating pairs and producing a new population until an end criterion is satisfied; and
configuring the system in accordance with a selected one of the parameter sets from the final population;
wherein the system comprises at least one record scanner operable to make a record signature for a known article, a database operable to store a record signature for a known article and a test scanner operable to make a signature for an article under test for comparison to one or more record signatures in the database.

11. The system of claim 10, wherein the end criterion includes one or more of a fixed number of iterations, a fixed number of iterations following a given result event; and a behaviour pattern in the overall population fitness values.

12. The system of claim 11, wherein the behaviour pattern is a convergent behaviour.

13. The system of claim 10, further including introducing a random mutation during or after the producing a new population.

14. The system of claim 13, wherein the mutation is inconsistent between iterations.

15. The system of claim 10, wherein each of the record scanner and the test scanner is operable to generate a signature for an article by:
sequentially illuminating a plurality of regions of the article with a coherent beam;
collecting a set comprising groups of data points from signals obtained when the coherent beam scatters from the different regions of the article, wherein different ones of the groups of data points relate to scatter from the respective different regions of the article; and
determining a signature of the article from the set of groups of data points.

16. The system of claim 10, wherein the definition of system performance includes at least one of a distribution width of a set of cross-comparisons between article signatures, and a distribution spacing between cross-comparison results for comparisons between like and non-like articles.

17. The system of claim 10, wherein the set of parameters includes at least one parameter selected from the group consisting of a time domain filter order, a time domain filter rise and fall space, a space domain filter order, a space domain rise and fall space, a spatial resolution, a smoothing function, an encoder setting, a block size, a number of blocks, a fitting polynomial order, a stretch range, a standard deviation threshold, an initial positioning offset, a text removal filter setting, an image threshold, and a scale amplitude.

18. The system of claim 10, wherein the set of parameters includes parameters that relate to post capture processing of the data points.

* * * * *